(12) United States Patent
Mimura et al.

(10) Patent No.: US 7,865,942 B2
(45) Date of Patent: *Jan. 4, 2011

(54) COMMUNICATION DEVICE, COMMUNICATION SYSTEM AND METHOD FOR MANAGING ACCESS AUTHORITY DATA

(75) Inventors: Atsuhiko Mimura, Chiba (JP); Naoko Kumagai, Tokyo (JP); Hiroki Kotani, Tokyo (JP)

(73) Assignee: Sony Corporation, Tokyo (JP)

( * ) Notice: Subject to any disclaimer, the term of this patent is extended or adjusted under 35 U.S.C. 154(b) by 791 days.

This patent is subject to a terminal disclaimer.

(21) Appl. No.: 11/497,103

(22) Filed: Aug. 1, 2006

(65) Prior Publication Data

US 2006/0265600 A1    Nov. 23, 2006

Related U.S. Application Data

(62) Division of application No. 10/317,969, filed on Dec. 12, 2002, now Pat. No. 7,596,805.

(30) Foreign Application Priority Data

Dec. 13, 2001  (JP)  .............................. 2001-380771

(51) Int. Cl.
*G06F 17/30* (2006.01)
*G06F 15/173* (2006.01)

(52) U.S. Cl. ........................... 726/6; 709/223; 709/225; 709/249

(58) Field of Classification Search ........................ None
See application file for complete search history.

(56) References Cited

U.S. PATENT DOCUMENTS

| 5,426,421 | A | * | 6/1995 | Gray | ........................... | 709/223 |
| 5,941,947 | A | * | 8/1999 | Brown et al. | ................. | 709/225 |
| 6,233,588 | B1 | * | 5/2001 | Marchoili et al. | ........... | 707/200 |
| 2002/0077996 | A1 | * | 6/2002 | Regelski et al. | ................. | 707/1 |

FOREIGN PATENT DOCUMENTS

| JP | 3 106141 | 5/1991 |
| JP | 6 231059 | 8/1994 |
| JP | 8 305691 | 11/1996 |
| JP | 9 224050 | 8/1997 |

(Continued)

OTHER PUBLICATIONS

"The Authoritative Dictionary of IEEE Standards Terms, Seventh Edition", copyright 2000, p. 234.*

*Primary Examiner*—Ponnoreay Pich
(74) *Attorney, Agent, or Firm*—Frommer Lawrence & Haug LLP; William S. Frommer; Thomas F. Presson

(57) ABSTRACT

A communication device including an access authority data managing DB device for managing access authority data with which access authority for at least one of storage area defined logically or physically in a storage device. File data stored in the storage area is defined while at least one of a user making the access and a group to which the user concerned belongs is set as a unit. A non-open WWW device controls access to the storage device on the basis of the access authority data achieved from the access authority data managing DB device in accordance with an access from a terminal device.

6 Claims, 20 Drawing Sheets

FOREIGN PATENT DOCUMENTS

| | | |
|---|---|---|
| JP | 10 124373 | 5/1998 |
| JP | 2001 5727 | 1/2001 |
| JP | 2001 166978 | 6/2001 |
| JP | 2001 216267 | 8/2001 |
| JP | 2002 41506 | 2/2002 |

* cited by examiner

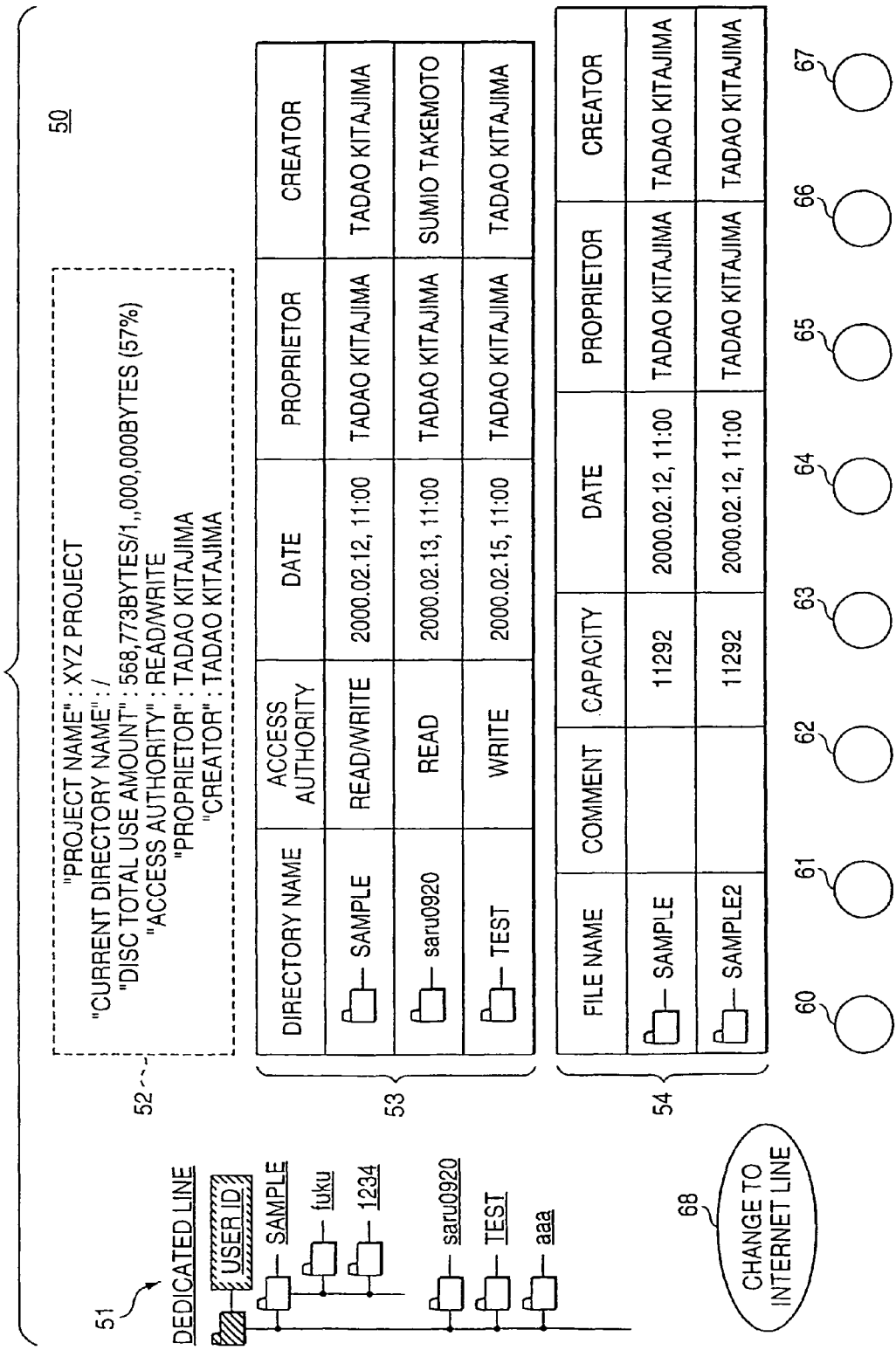

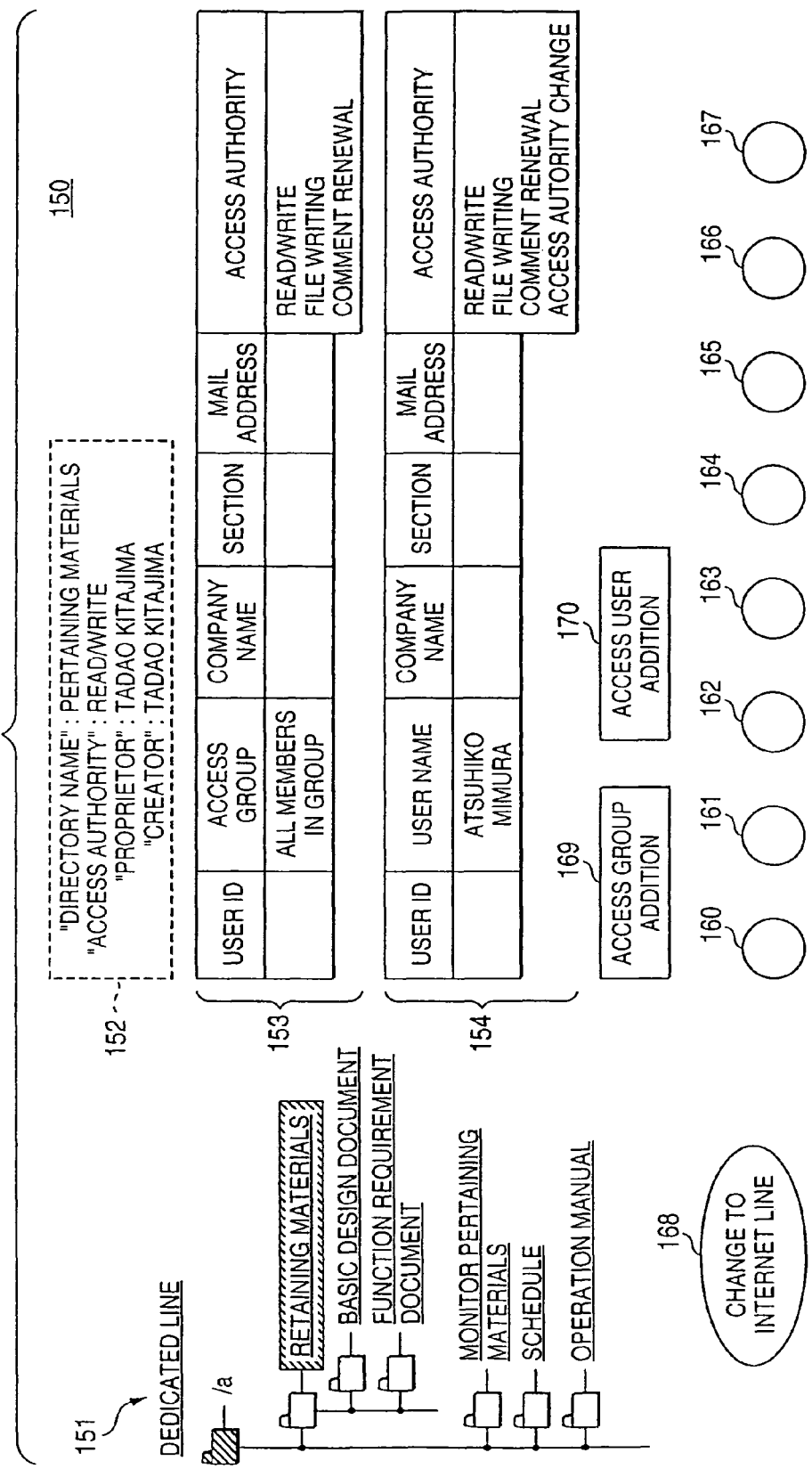

FIG. 4

| AUTHORITY NAME | CONTENT |
|---|---|
| READING AUTHORITY | DISPLAY DIRECTORY CONCERNED |
| WRITING AUTHORITY | CHANGE NAME OF DIRECTORY CONCERNED, ADD FILE |
| FILE WRITING AUTHORITY | CHANGE OF FILE IN DIRECTORY CONCERNED |
| COMMENT CHANGING AUTHORITY | CHANGE COMMENT OF FILE IN DIRECTORY CONCERNED |
| ACCESS AUTHORITY CHANGING AUTHORITY | CHANGE ACCESS AUTHORITY GIVEN TO DIRECTORY CONCERNED |

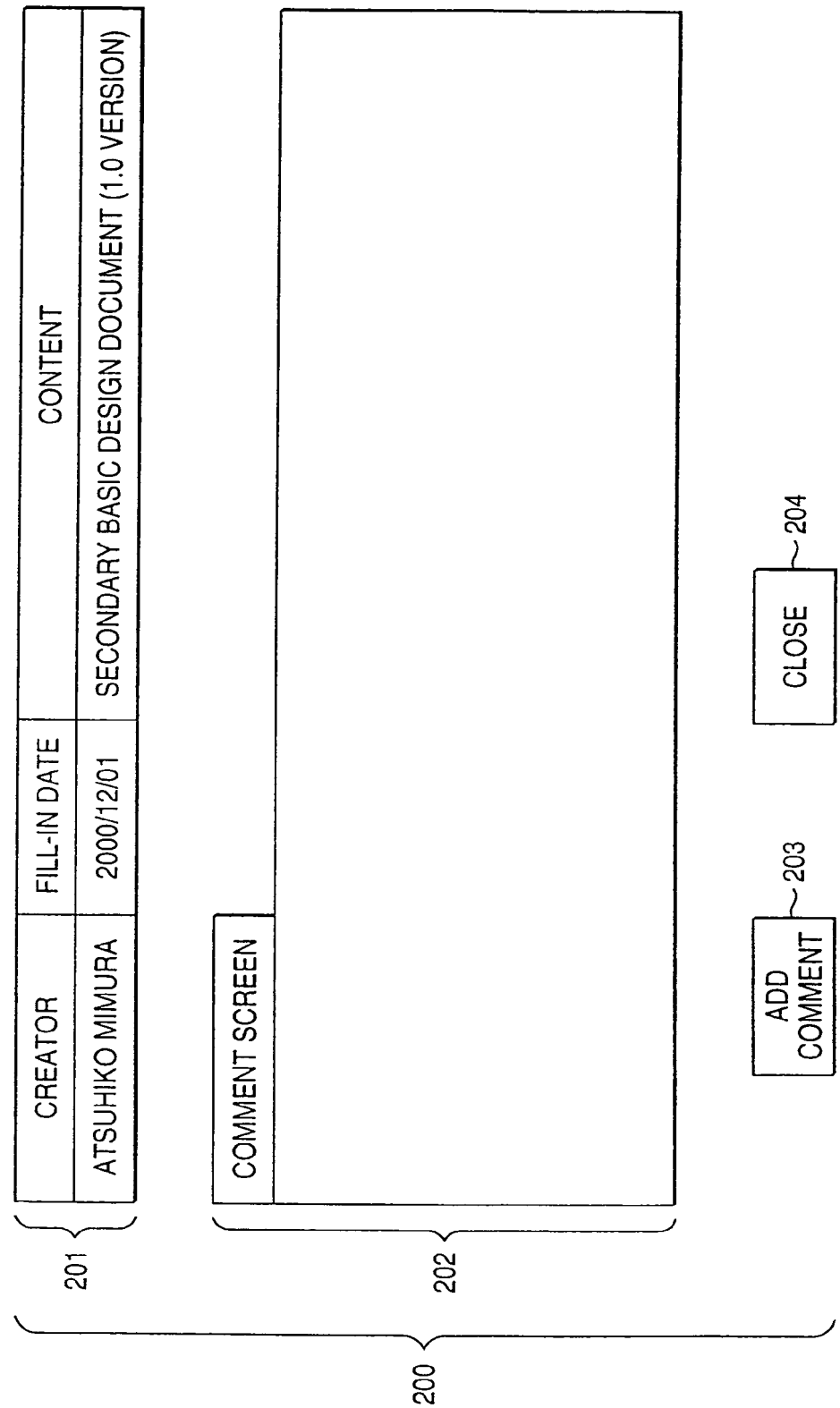

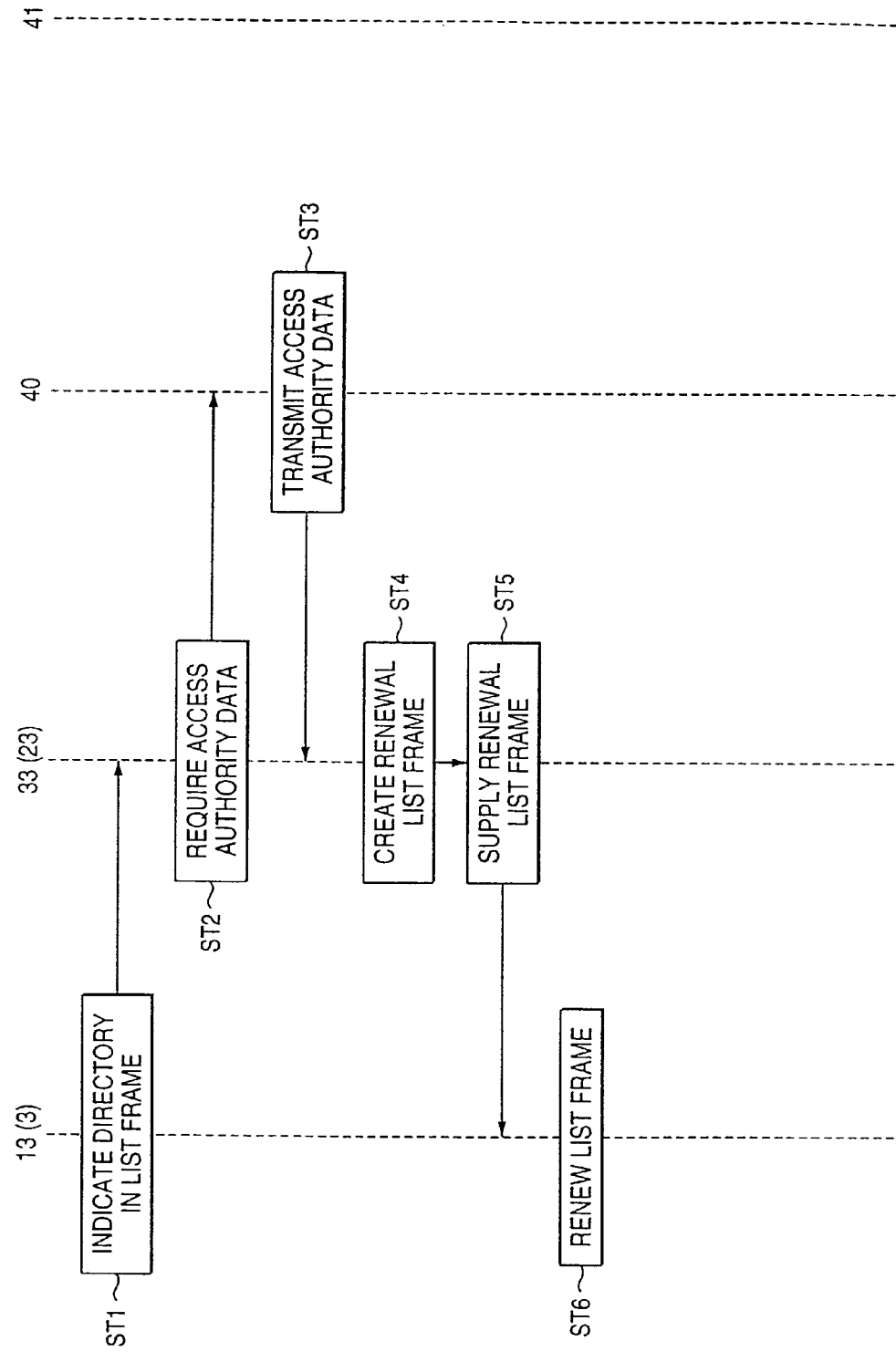

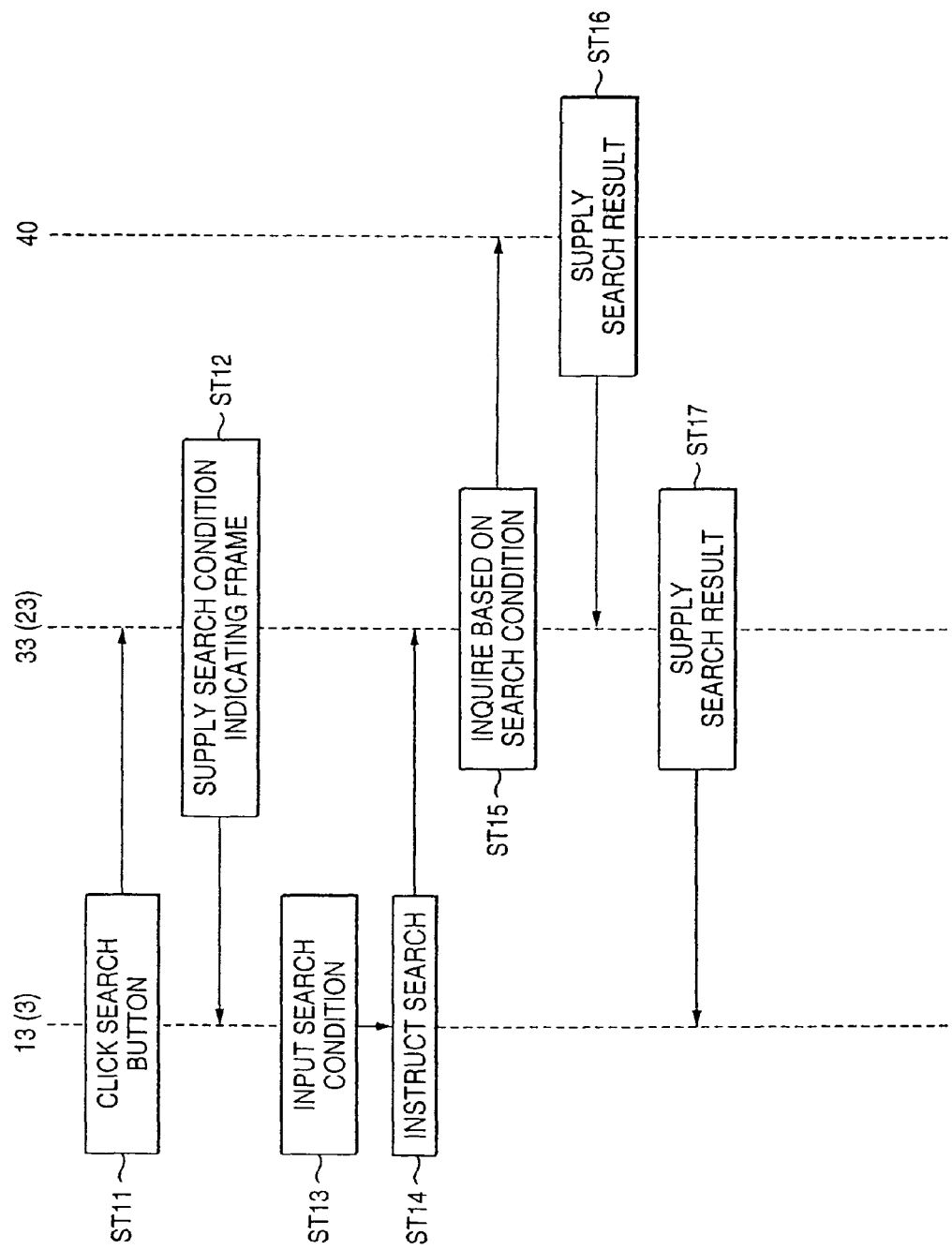

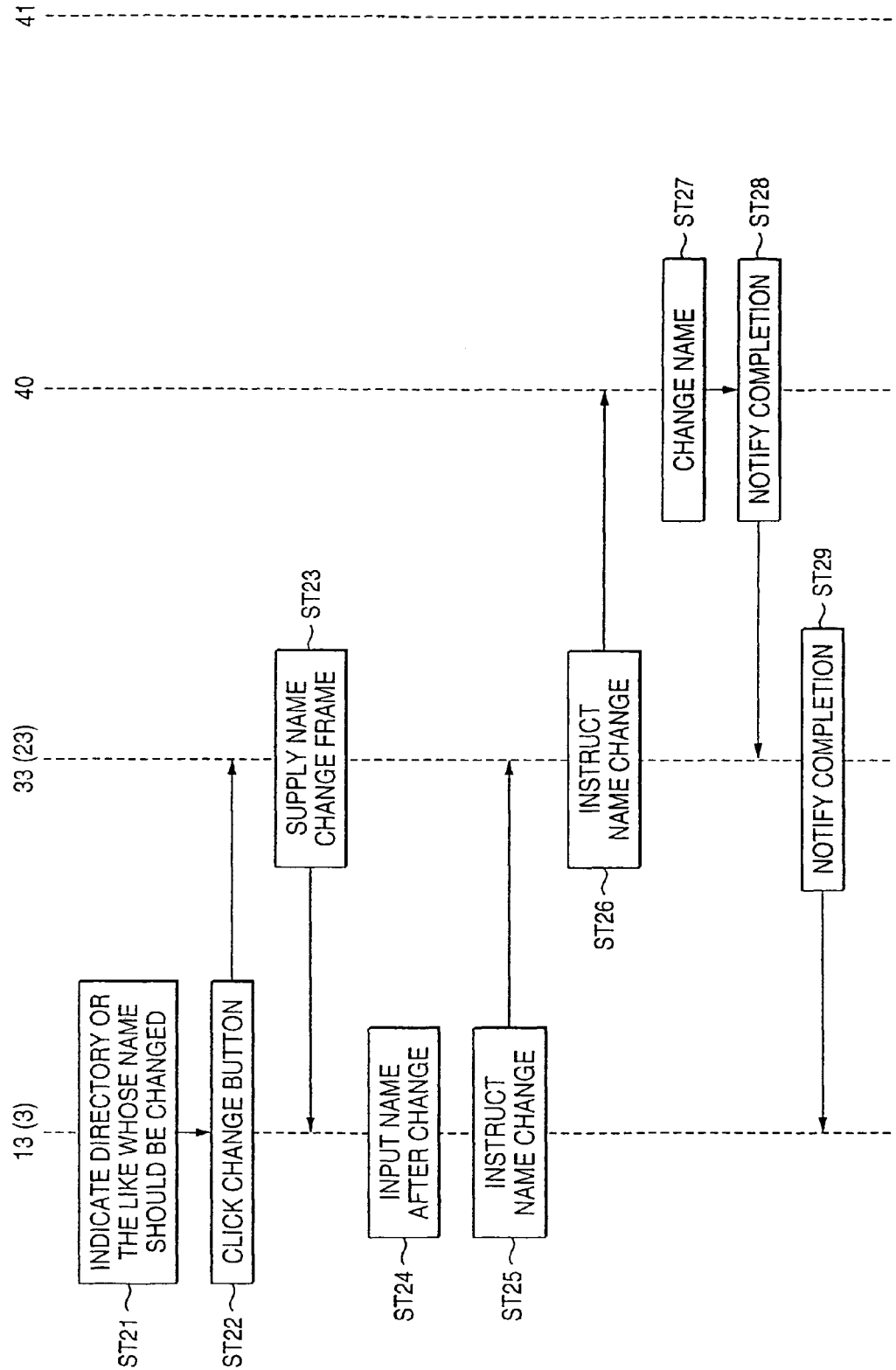

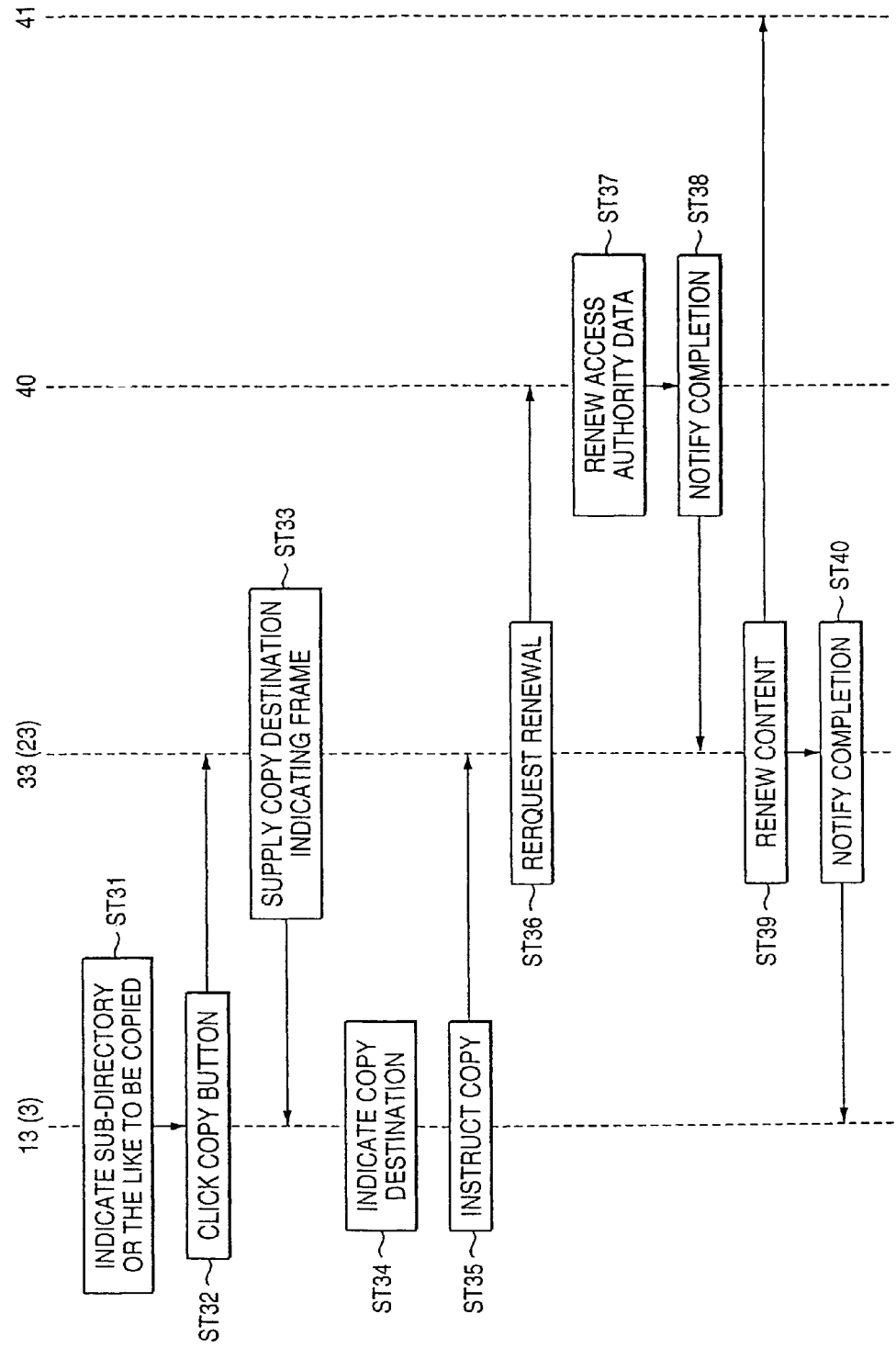

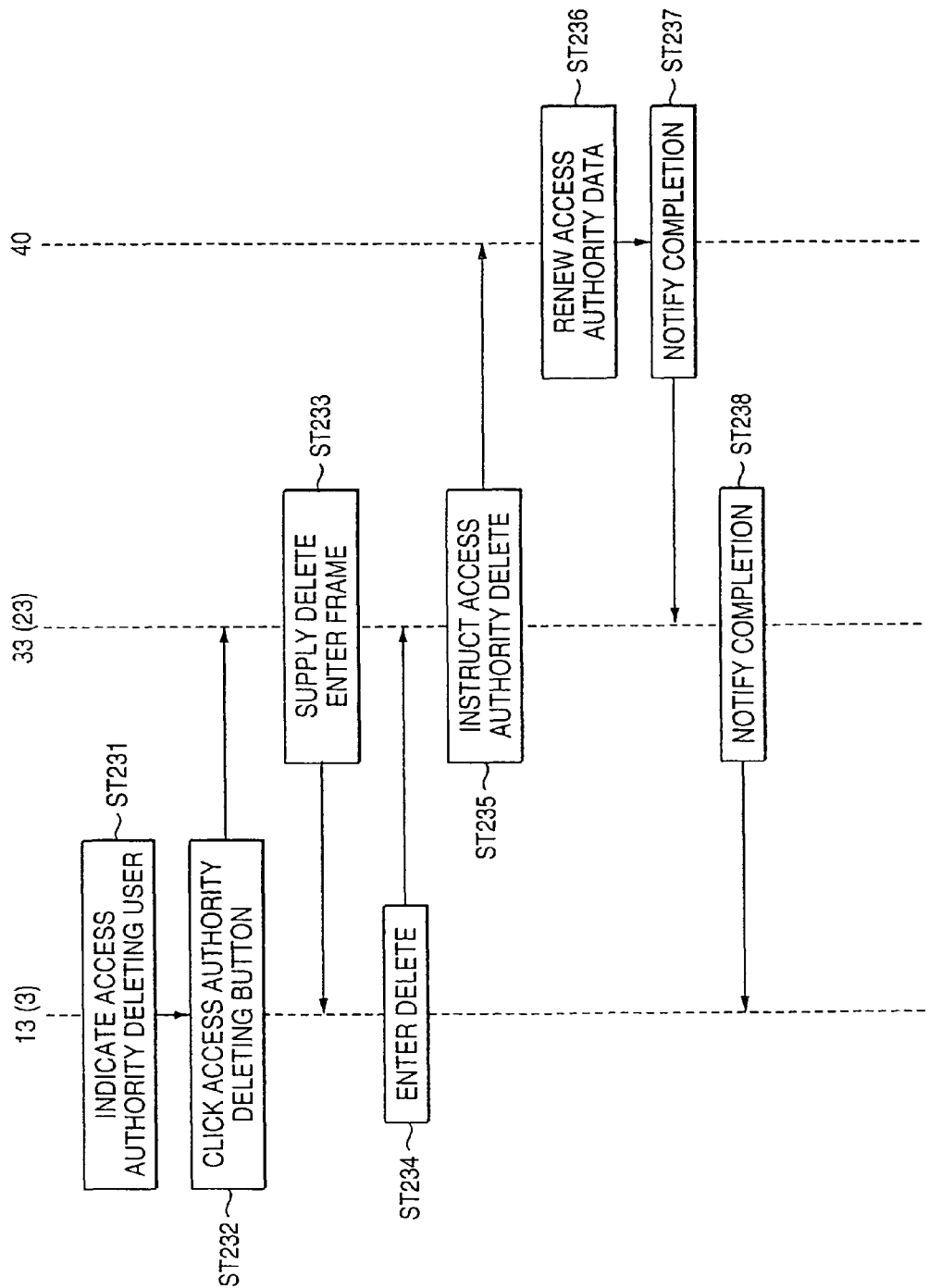

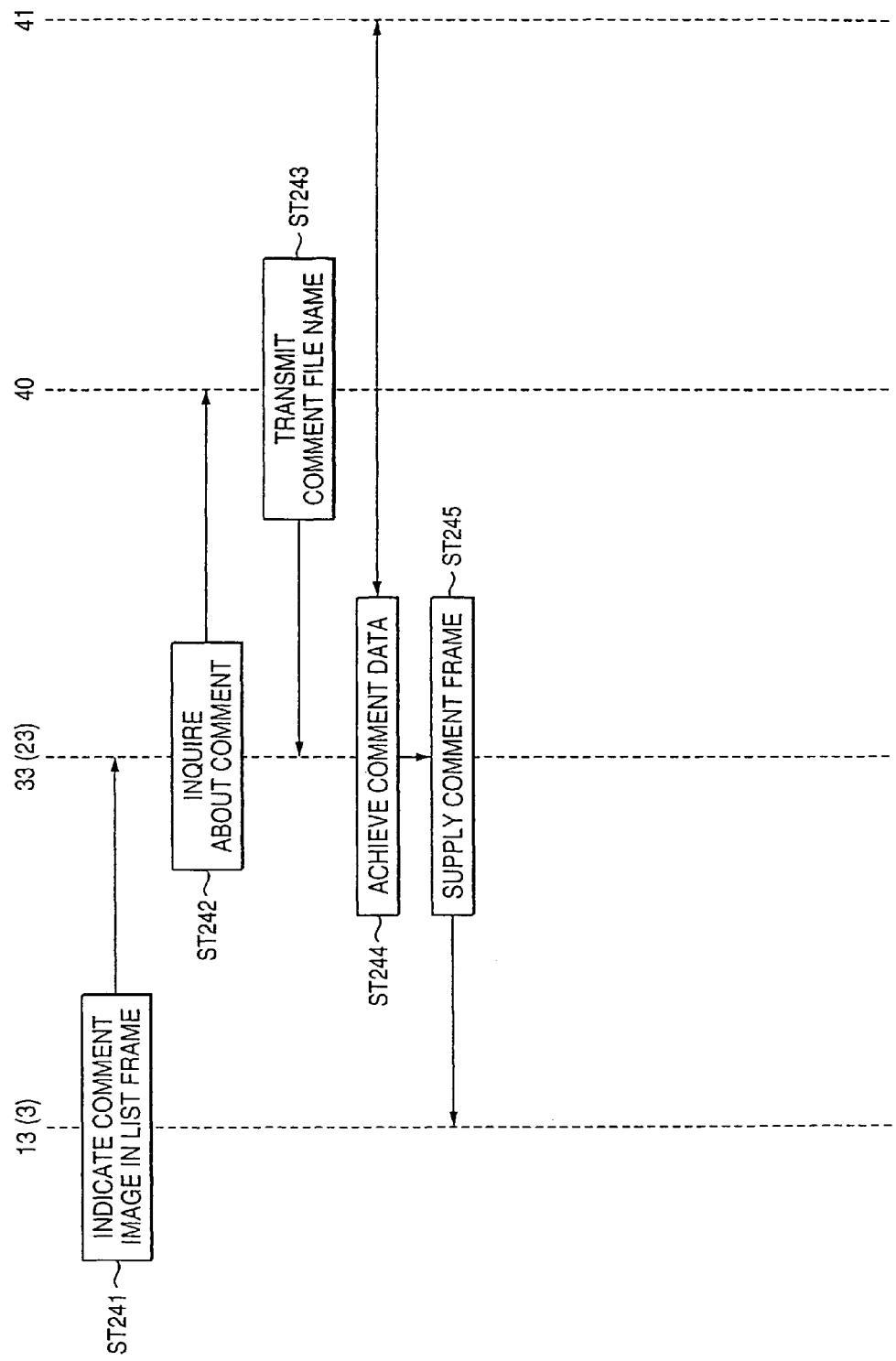

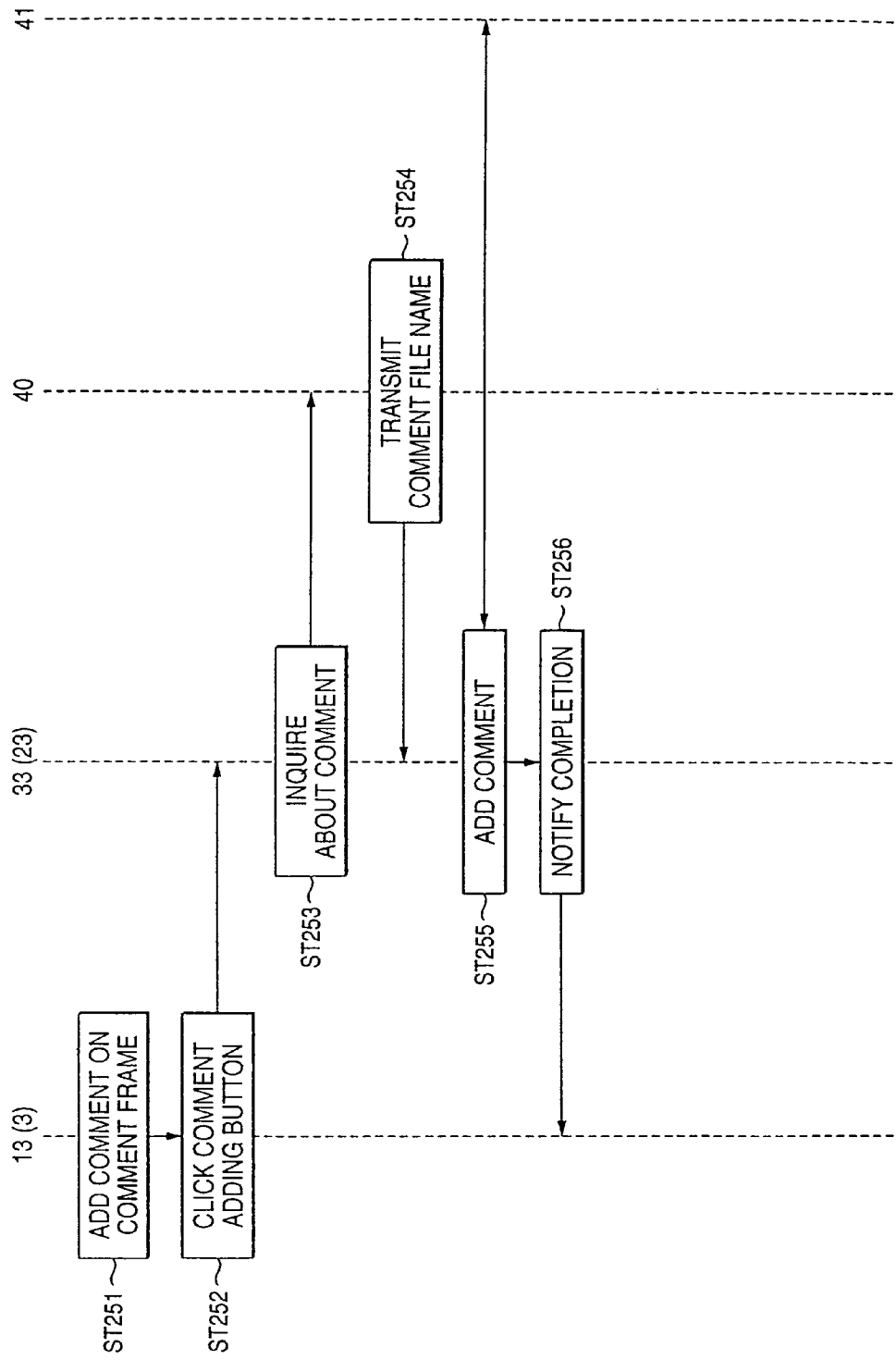

COMMUNICATION DEVICE, COMMUNICATION SYSTEM AND METHOD FOR MANAGING ACCESS AUTHORITY DATA

This is a division of application Ser. No. 10/317,969, filed Dec. 12, 2002 now U.S. Pat. No. 7,596,805, which is entitled to the priority filing date of Japanese application 2001-380771, filed in Japan on Dec. 13, 2001, the entirety of which is incorporated herein by reference.

BACKGROUND OF THE INVENTION

1. Field of the Invention

The present invention elates to a communication device, a communication and a method therefor with which plural users are enabled to commonly use storage means on a network with keeping securities.

2. Description of the Related Art

There has been hitherto known a network storage in which plural users located at geographically different places are connected to one another through the Internet to enable file data communications (reception and transmission) among them.

In the conventional network storage, a storage environment is given every individual user, and thus users can never use the storage environments of the other users. Furthermore, services which are available to other users can be supplied to the other users by authenticating the other users with open ID and password for the other users concerned or teaching URL (address) of file data which are wished to be commonly used.

For example when plural users commonly use a storage on a network as a memory by using computers connected to the network concerned, it is required to manage access authority every user. However, as described above, if the access management to the storage is carried out by using IDs and passwords, for example, it would be impossible to perform access management with which directories in a storage and file data stored in the directories concerned are diversely defined. Furthermore, with the method using URL as described above, an access to the storage by an unjust user is unavoidable and thus the securities cannot be kept.

SUMMARY OF THE INVENTION

The present invention has been implemented in view of the foregoing problem of the conventional technique, and has an object to provide a communication device, a communication system and a method therefor with which plural users can use a storage on a network with keeping securities.

In order to attain the above object, according to a first aspect of the present invention, there is provided a communication device which accepts an access from a single or plural other communication devices through a network in accordance with the operation of plural users, characterized by comprising: storage means; managing means for managing access authority data which defines access authority for at least one of a directory defined in the storage means and file data stored in the directory concerned every at least one of a user who makes the access and a group to which the user concerned belongs; and access control means for making an inquiry to the managing means in accordance with the access and controlling the access to the storage means on the basis of the access authority data received from the managing means in response to the inquiry concerned every user or group (i.e., with at least one of the user and the group as a management unit).

According to the operation of the communication device of the first aspect of the present invention, when another communication device accesses the communication device concerned, the access control means makes an inquiry to the managing device. Thereafter, the managing device supplies the access authority data corresponding to the inquiry concerned to the access control device. The access control means performs the access control on the storage means on the basis of the access authority which is provided every at least one of a user defined in the access authority data thus supplied and a group to which the user concerned belongs.

Accordingly, minute access control can be performed every user or group as a unit.

In the communication device of the first aspect of the present invention, it is preferable that the access control means receives an operation instruction relating to the directory or the file data from the other communication device in association with the access, judges on the basis of the access authority data whether the operation instruction has authentication and carries out the processing corresponding to the operation instruction if the authentication of the operation instruction is authorized.

Furthermore, in the communication device of the first aspect of the present invention, it is preferable that the operation instruction is an instruction concerning at least one of search, name change, copy, movement, deletion and upload of the directory or file data.

Still furthermore, in the communication device of the first aspect of the present invention, it is preferable that the access authority data defines at least one of authority for receiving a display of the directory concerned, authority for changing the name of the directory concerned, authority for adding file data into the directory concerned, authority for altering file data stored in the directory concerned, authority for changing a comment of file data stored in the directory concerned and authority for changing access authority given to the directory concerned.

Still furthermore, in the communication device of the first aspect of the present invention, it is preferable that the storage means stores the comment data corresponding to the file data, the managing means manages the access authority data which defines authority for performing at least one of change and addition of the comment data every at least one of the user and the group, and the access control means controls at least one of the change and addition of the comment data on the basis of the access authority data.

Still furthermore, in the communication device of the first aspect of the present invention, it is preferable that when receiving from the other communication device an operation instruction indicating at least one of the change and addition of the access authority indicated by the access authority data, the access control means judges whether the operation instruction has authentication, and instructs at least one of the change and addition of the access authority data corresponding to the operation instruction to the managing means if the operation instruction is judged to have authentication.

Still furthermore, in the communication device of the first aspect of the present invention, it is preferable that the access control means supplies the other communication device with a display screen containing an image in which the directory is shown in a tree structure, an image indicating access authority data received from the managing means and an image indicating the directory thus indicated and the operation pertaining to the file data on the display screen.

Still furthermore, in the communication device of the first aspect of the present invention, it is preferable that the communication device is further equipped with authenticating means for performing user authentication and permitting an access from the other communication device to the access control means under the condition that the authentication of the user concerned is accepted.

Still furthermore, in the communication device of the first aspect of the present invention, it is preferable that the storage means, the managing means, the access control means and the authenticating means are protected by fire wall.

According to a second aspect of the present invention, there is provided a communication system which accepts an access from a single or plural other communication devices in accordance with the operation of plural users through a network, characterized by comprising: storage means; managing means for managing access authority data for defining access authority for at least one of first and second areas logically or physically defined in the storage means and file data stored in the first and second storage areas concerned every at least one of a user making the access and a group to which the user concerned belongs; first access-control means for making an inquiry to the managing means in response to a request for an access to the first storage area and controlling the access to the first storage area on the basis of the access authority data received from the managing means in response to the inquiry every user or group; and second access control means for making an inquiry to the managing means in response to a request for an access to the second storage area and controlling the access to the second storage area on the basis of the access authority data received from the managing means in response to the inquiry every user or group.

According to a third aspect of the present invention, there is provided a communication method for carrying out predetermined processing upon receiving an access from single or plural other communication devices through a network in accordance with operations of plural users, characterized by comprising the steps of: managing access authority data which defines access authority for at least one of a storage area logically or physically defined in storage means and file data stored in the storage area every at least one of a user making the access and a group to which the user concerned belongs, and controlling the access to the storage means on the basis of the access authority data in accordance with the access.

Furthermore, according to a fourth aspect of the present invention, there is provided a communication method for receiving an access from single or plural other communication devices through a network in accordance with operations of plural users and carrying out processing by using storage means, managing means, first access control means and second access control means, characterized in that the managing means manages access authority data which define access authority for at least one of first and second storage areas defined logically or physically in the storage means and file data stored in the first and second storage areas every at least one of a user making the access and a group to which the user concerned belongs, the first access control means makes an inquiry to the managing means in accordance with the access to the first storage area and controls the access to the first storage area on the basis of the access authority data received from the managing means in response to the inquiry, and the second access control means makes an inquiry to the managing means in accordance with the access to the second storage area, and controlling the access to the second storage area on the basis of the access authority data received from the managing means in response to the inquiry.

BRIEF DESCRIPTION OF THE DRAWINGS

FIG. 2 is a diagram showing a list display screen displayed in a terminal device;

FIG. 3 is a diagram showing an access authority screen displayed in the terminal device;

FIG. 4 is a diagram showing the types of access authority;

FIG. 5 is a diagram showing a comment screen displayed in the terminal device;

FIG. 6 is a diagram showing an example of the operation when a user indicates a prescribed directory under the condition that a tree display image shown in FIG. 2 is displayed;

FIG. 7 is a diagram showing an example of the operation when a user indicates a search button image on the list display screen shown in FIG. 2 by using a mouse or the like;

FIG. 8 is a diagram showing an example of the operation when a user indicates a name changing button image on the list display screen shown in FIG. 2 by using the mouse or the like;

FIG. 9 is a diagram showing an example of the operation when a user indicates a copy button image on the list display screen shown in FIG. 2 by using the mouse or the like;

FIG. 10 is a diagram showing an example of the operation when a user indicates a moving button image on the list display screen shown in FIG. 2 by using the mouse or the like;

FIG. 11 is a diagram showing an example of the operation when a user indicates a delete button image on the list display screen shown in FIG. 2 by using the mouse or the like;

FIG. 12 is a diagram showing an example of the operation when a user indicates a copy button image to the Internet on the list display screen shown in FIG. 2 by using the mouse or the like;

FIG. 13 is a diagram showing an example of the operation when a user indicates a new creation button image on the list display screen shown in FIG. 2 by using the mouse or the like;

FIG. 14 is a diagram showing an example of the operation when a user indicates an upload button image on the list display screen shown in FIG. 2 by using the mouse or the like;

FIG. 15 is a diagram showing an example of the operation when a user indicates an access authority button image on the access authority screen shown in FIG. 3 by using the mouse or the like;

FIG. 16 is a diagram showing an example of the operation when a user indicates an access authority adding button image on the access authority screen shown in FIG. 3 by using the mouse or the like;

FIG. 18 is a diagram showing an example of the operation when access authority of a user or the like is deleted on the access authority screen shown in FIG. 3;

FIG. 19 is a diagram showing an example of the operation when the comment screen shown in FIG. 5 is shown; and FIG. 20 is a diagram showing an example of the operation when a user adds a comment on the comment screen shown in FIG. 5.

DETAILED DESCRIPTION OF THE PREFERRED EMBODIMENTS

Preferred embodiments according to the present invention will be described hereunder with reference to the accompanying drawings.

First, a communication system according to an embodiment of the present invention will be described hereunder.

Figure 1:
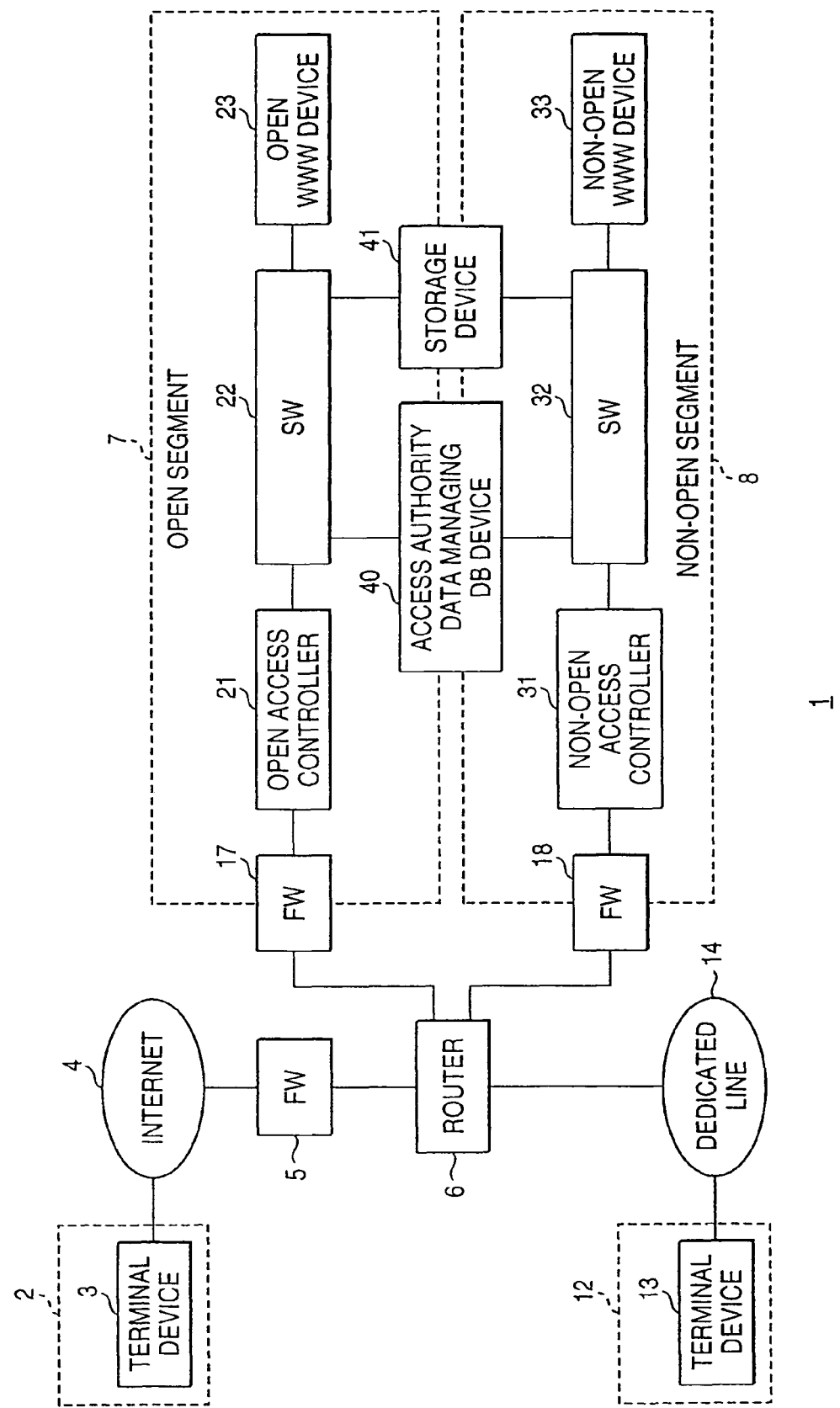
FIG. 1 is a diagram showing the overall construction of a communication system according to an embodiment of the present invention.

FIG. 1 is a diagram showing the overall construction of a communication system 1 according to an embodiment of the present invention.

In the communication system 1, a terminal device 3 used by a user 2 is connected to the Internet 4, and a terminal device 13 used by a user 12 is connected to a dedicated line 14 as shown in FIG. 1. The user 2 is a general Internet user, and the user 12 is a user who is permitted in advance to use the dedicated line 14.

A router 6 is connected to the Internet 4 through a fire wall 5, and it is also connected to the dedicated line 14. Further, the router 6 is connected to an open segment 7 through a fire wall 17, and also it is connected to a non-open segment 8 through a fire wall 18.

The open segment 7 has an open access controller 21, a switch device 22, an open WWW (World Wide Web) device 23, an access authority data managing DB device 40 and a storage device 41 in the range protected by the fire wall 17.

The non-open segment 8 has a non-open access controller 31, a switch device 32, a non-open WWW device 33, an access authority data managing DB device 40 and a storage device 41 in the range protected by the fire wall 18.

As described above, the open segment 7 and the non-open segment 8 commonly use the access authority data managing DB device 40 and the storage device 41.

FIG. 1 shows such a situation that the single terminal device 3 is connected to the Internet 4 and the single terminal device 13 is connected to the dedicated line 14. However, actually, plural terminal devices are connected to the Internet 4 and the dedicated line 14.

In the communication system 1, an access to the open segment 7 by the terminal device 3 is made through the Internet 4, the fire wall 5, the router 6 and the fire wall 17. Further, an access to the open segment 7 by the terminal device 13 is made through the dedicated line 14, the router 6 and the fire wall 17. An access to the non-open segment 8 by the terminal device 13 is made through the dedicated line 14, the router 6 and the fire wall 18.

The open segment 7 and the non-open segment 8 identify users by using user IDs.

The communication system 1 has the following features.

In the communication system 1, each of plural users uses the storage device 41 through the Internet 4 and the dedicated line 14. That is, plural users can access the same storage environment.

Furthermore, in the communication system 1, access authority to perform reading, writing, uploading, etc. of file data on the storage device 41 is set every user or every group to which plural users belong. In addition, in the communication system 1, user registration can be performed among users using the communication system 1.

The users of the dedicated line 14 can determine on the basis of the network characteristic whether they use the storage device 41 through the Internet or directly through the dedicated line 14.

Here, the use of the storage device 41 through the Internet 4 brings advantages that a user can access the storage device 41 by using ISP (Internet Service Provider) with which the user has been already affiliated, that the access can be made at any place, etc.

The use of the storage device 41 through the dedicated line 14 brings advantages that a needed using time can be assumed because the band is guaranteed, that it is unnecessary to take the effect of traffic of other users into consideration, that the security level is high because the user connects to the storage device directly in terms of the network, etc.

Furthermore, in the communication system 1, file data stored in the storage device 41 are associated with comment data which are used when plural users use the storage device 41 interoperably.

In FIG. 1, the terminal device 3 and the terminal device 13 correspond to the other communication devices of the present invention, the storage device 41 corresponds to the storage means of the present invention, and the access authority data managing DB device 40 corresponds to the managing means of the present invention.

The open access controller 21 and the open WWW device 23 correspond to the access control means and the first access control means of the present invention, and the non-open access controller 31 and the non-open WWW device 33 correspond to the access control means and the second access control means of the present invention. Each of components shown in FIG. 1 will be described hereunder.

(Terminal Device 3)

The terminal device 3 is a personal computer, for example, and it accesses the open segment 7 through the router 6 by using, for example, a generally-used browser in accordance with the operation of a keyboard or mouse of a user 2 who uses the general Internet.

(Terminal Device 13)

The terminal device 13 is a personal computer, for example, and it accesses the open segment 7 and the non-open segment 8 through the router 6 by using, for example, a generally-used browser in accordance with the operation of a keyboard or mouse of a user 12 who uses the dedicated line 14.

(Fire Wall 5)

The fire wall 5 carries out the operation of keeping the securities of the access to the router 6 through the Internet 4 in accordance with prescribed security policy.

(Router 6)

The router 6 carries out the routing of the access received from the Internet 4 through the fire wall 5 to the fire wall 17, and also carries out the routing of the access received through the dedicated line 14 to the fire wall 17 or the fire wall 18.

(Fire Wall 17)

The fire wall 17 performs the operation of keeping the securities of the access to the open access controller 21 through the router 6 in accordance with prescribed security policy.

(Fire Wall 18)

The fire wall 18 carries out the operation of keeping the securities of the access to the non-open access controller 31 through the router 6 in accordance with prescribed security policy.

(Open Access Controller 21)

The open access controller 21 performs user authentication relating to the access to the open segment 7, and permits only authentication-accepted users to access the open segment 7.

Furthermore, after the user authentication, the open access controller 21 controls the access to the access authority data managing DB device 40 and the open storage area of the storage device 41 by the user concerned in cooperation with the open WWW device 23.

(Switch Device 22)

The switch device 22 selectively determines the connection among the open access controller 21, the open WWW device 23, the access authority data managing DB device 40 and the storage device 41.

(Open WWW Device 23)

The open WWW device 23 carries out various processing relating to the use of the storage device 41 by the terminal device 3 and the terminal device 13 in cooperation with the open access controller 21.

(Non-Open Access Controller 31)

The non-open access controller 31 performs the user authentication relating to the access to the non-open segment 8, and permits only authentication-accepted users to access the non-open segment 8.

After the user authentication, the non-open access controller 31 controls the access to the access authority data managing DB device 40 and the non-open storage area of the storage device 41 by the user concerned in cooperation with the non-open WWW device 33.

(Switch Device 32)

The switch device 32 selectively determines the connection of the non-open access controller 31, the non-open WWW device 33, the access authority data managing DB device 40 and the storage device 41.

(Non-Open WWW Device 33)

The non-open WWW device 33 performs various processing relating to the use of the access authority data managing DB device 40 and the storage device 41 by the terminal device 13 in cooperation with the non-open access controller 31.

(Access Authority Data Managing DB Device 40)

The access authority data managing DB device 40 is commonly used by the open segment 7 and the non-open segment 8, and it has access authority data indicating the authority for using (accessing) the open segment 7 and access authority data indicating the authority for using the non-open segment 8.

The access authority data are data for defining the authority to access a directory and file data in the storage area of the storage device 41. Further, the access authority data contain information on the attributes of a directory and a sub-directory defined in the storage device 41 and information on the attributes of file data stored in the directory and the sub-directory.

The access authority data managing DB device 40 consolidates the management of user's accesses to the open segment 7 and the non-open segment 8.

(Storage Device 41)

The storage device 41 is commonly used by the open segment 7 and the non-open segment 8, and it has an open storage area and a non-open storage area which are logically or physically defined. The open storage area is an area for which an access is controlled by using the open access controller 21 and the open WWW device 23, and the non-open storage area is an area for which an access is controlled by using the non-open access controller 31 and the non-open WWW device 33.

A list screen to be supplied from the non-open WWW device 33 to the terminal 13 in response to an access from the terminal device 13 through the dedicated line 14 will be described.

In the following description, the screen to be supplied from the non-open WWW device 33 to the terminal device 13 will be described. However, the screen to be supplied from the open WWW device 23 to the terminal device 3 is the same as described below except that it relates to the open storage area of the storage device 41.

FIG. 2 is a diagram showing the list display screen 50 concerned.

As shown in FIG. 2, the list display screen 50 contains a tree display image 51 in which directories defined in the non-open storage area of the storage device 41 are shown in a tree structure, a directory attribute display image 52 indicating the attribute of a directory indicated, a sub-directory attribute display image 53 indicating the attributes of sub-directories in the directory indicated, a file attribute display image 54 indicating the attribute of file data existing in the directory indicated, and button images 60 to 68 for user's operations.

For example, the list display screen 50 is created on the basis of the access authority data supplied from the access authority data managing DB device 40 by the non-open WWW device 33, and then supplied to the terminal device 13.

The directory structure defined in the storage area (in this operation example, non-open storage area) of the storage device 41 is shown in the tree display image 51. The display of the directory structure is made in such a manner that, for example, a user to which reading authority is not given is provided with a display of information on the directory concerned to the extent that the user concerned cannot understand the detailed content of the directory the reading authority for which is not given to the user.

At this time, the open WWW device 23 judges the presence or absence of the reading authority of the user on the basis of the user ID which is received together with the access and the access authority data which defines the access authority on the basis of the user ID concerned.

When the user indicates a prescribed directory in the tree display image 51 on the list display screen 50 by using a mouse or the like, the directory attribute display image 52 of the directory concerned is displayed.

The directory attribute display image 52 contains "project name", "current directory name", "disc total use amount", "access authority", "proprietor" and "creator" relating to the directory concerned.

The "project name" displays the name of a project in which a user participates. The "disc use amount" displays the total use amount and the maximum capacity of the disc in the project. The "access authority" displays access authority of a user using the directory under display.

The sub-directory attribute display image 53 contains various information such as the directory name which is attribute information of sub-directories defined in the directory indicated, the access authority of the sub-directories, creating date, directory proprietor and directory creator.

Furthermore, the file attribute display image 54 contains various information such as the file name corresponding to file data stored in the sub-directory indicated, comment data corresponding to the file data, file size, creating date, file proprietor and file creator.

Further, the comment data are displayed on another screen by clicking the place corresponding to the comment data concerned in the sub-directory attribute display image 53 through the mouse or the like.

Upon user's clicking a search button image 60 through the mouse or the like, the function of displaying the directory matched with the search condition indicated by the user and the file data is supplied by the non-open WWW device 33.

Upon user's clicking a change button image 61 through the mouse or the like, the function of changing the name of the indicated sub-directory or file data on the list display screen 50 is supplied by the non-open WWW device 33.

Upon user's clicking a copy button image 62 through the mouse or the like, the function of copying the indicated sub-directory or file data on the list display screen 50 to another directory is supplied by the non-open WWW device 33.

Upon user's clicking a moving button image 63 through the mouse or the like, the function of moving the indicated sub-directory or file data on the list display screen 50 to another directory is supplied by the non-open WWW device 33.

Upon user's clicking a delete button image 64 through the mouse or the like, the function of deleting the indicated sub-directory or file data on the list display screen 50 is supplied by the non-open WWW device 33.

Upon user's clicking a copy button image 65 for copying to the Internet through the mouse or like, the function of copying the indicated sub-directory or file data to the directory indicated in the open storage area of the storage device 41 under the state that the list display screen 50 of the non-open storage area of the storage device 41 is displayed is supplied by the non-open-WWW device 33.

On the other hand, when the list display screen 50 of the open storage area is displayed, a copy button image for copying to the dedicated line is displayed, and by clicking the copy button image, the function of copying the indicated sub-directory or file data to the directory indicated in the non-open storage area of the storage device 41 is supplied by the non-open WWW device 33.

Upon user's clicking a new creation button image 66 through the mouse or the like, a sub-directory is created in a directory displayed on the list display screen 50.

By user's clicking an upload button image 67 through the mouse or the like, the function of uploading the file data into the directory displayed on the list display screen 50 is supplied by the non-open WWW device 33.

By displaying a change button image 68 on the Internet line and user's clicking the change button image 68 through the mouse or the like, the attribute information of the open storage area in the storage device 41 is displayed.

On the other hand, when the list display screen 50 of the open storage area is displayed, the change button image is displayed on the dedicated line, and by user's clicking the change button image, the attribute information of the non-open storage area in the storage device 41 is displayed.

An access authority screen 150 will be described hereunder.

FIG. 3 is a diagram showing the access authority screen 150.

When the display of "access authority" in the list display screen 50 shown in FIG. 2 is specified by user's clicking through the mouse or the like, the access authority screen 150 shown in FIG. 3 is supplied to the terminal device 13 by the non-open WWW device 33.

As shown in FIG. 3, the access authority screen 150 contains a tree display screen 151 in which directories defined in the non-open storage area of the storage device 41 are shown in a tree structure, a directory attribute display image 152 indicating the attribute of a directory indicated, a group authority display image 153 indicating a group having the access authority for accessing the indicated directory, a user authority display image 154 indicating a user having the access authority for accessing the directory indicated, and operation button images 160 to 170 concerning the access authority for accessing the directory indicated.

The group authority display image 153 shows data (ID) for specifying a group given access authority for accessing to the directory concerned, the name of a company to which the group concerned belongs, the section thereof, the mail address and the content of the access authority.

The user authority display image 154 shows the user ID of a user given access authority for accessing to the directory concerned, the user's name, the name of a company to which the user belongs, the section thereof, the mail address and the content of the access authority.

FIG. 4 is a diagram showing the types of the content of the access authority shown in FIG. 3.

As shown in FIG. 4, as the access authority are defined reading authority, writing authority, file writing authority, comment changing authority and access authority changing authority.

The reading authority is the authority for receiving the display of the directory concerned.

The writing authority is the authority for changing the name of the directory concerned or adding the file data.

The file writing authority is the authority for changing the file data in the directory concerned.

The comment changing authority is the authority for changing the comment data corresponding to the file data in the directory concerned.

The access authority changing authority is the authority for changing the access authority given to the directory concerned.

If the use clicks an access group adding button image 169 on the access authority screen 150 by using the mouse or the like, the access authority for accessing to the directory concerned is set to the indicated group by the non-open WWW device 33, and in connection with this setting, the access authority data stored in the access authority data managing DB device 40 is renewed.

If the user clicks an access user adding button image 170 on the access authority screen 150 by the mouse or the like, the access authority for accessing to the directory concerned is set to the indicated user by the non-open WWW device 33, and in connection with this setting, the access authority data stored in the access authority data managing DB device 40 is renewed.

Further, if the user clicks the respective items of the group authority display image 153 and the user authority display image 154 are clicked on the access authority screen 150 to write the contents into the items, the access authority data are renewed to the written contents by the non-open WWW device 33. If the user clicks the respective items of the group authority display image 153 and the user authority display image 154 on the access authority screen 150 to delete the contents thereof, the deleted contents are deleted from the access authority data by the non-open WWW device 33.

The access authority of the file data in each directory managed by the access authority data managing DB device 40 takes over the content of the access authority of the directory concerned as a rule.

Next, the comment data described above will be described hereunder.

Comment data which indicate the summary, annotation, etc. of the file data concerned can be stored in association with the file data in the storage device 41.

FIG. 5 is a diagram showing a comment screen 200 on which comment data are displayed.

A comment screen 200 is displayed on the screen of the terminal device 13 by the function of the non-open WWW device 33 when the user clicks the item of the comment in the file attribute display image 54 of the list display screen 50 shown in FIG. 2 by using the mouse or the like, for example.

As shown in FIG. 5, on the comment screen 200 are displayed an attribute display image 201 of indicated comment data, a comment image 202, a comment adding button image 203 and a screen closing image 204, for example.

The attribute display image 201 of the comment data contains the creator of the comment data concerned, the fill-in date, the content thereof, etc. When a new comment is added to the comment associated with the file-data concerned, the content is filled in the comment image 202. The content of the comment data is displayed to a user having reading authority for reading the corresponding file data.

The user can add a new comment about the displayed comment on the comment adding button image 203 by clicking the mouse or the like. The addition of the comment can be performed by only a user having comment changing authority, and the comment adding button image 203 is not displayed for a user having no authority.

Examples of the operation of the communication system 1 shown in FIG. 1 will be described hereunder. In the following examples, there is assumed such a situation that the terminal device 13 accesses the non-open segment 8 through the router 6.

FIRST OPERATION EXAMPLE

This operation example relates to a case where in FIG. 1 the user 12 operates the terminal device 13 to access the non-open segment 8 through the dedicated line 14 and the router 6, and indicates a prescribed directory under the state that the tree display image 51 shown in FIG. 2 is displayed on the display portion of the terminal device 13.

FIG. 6 is a diagram showing this operation example.

Step ST1:

The user 12 specifies a directory "SAMPLE" shown in FIG. 2 by clicking the mouse or the like.

Step ST2:

In accordance with an instruction of the step ST1, the non-open WWW device 33 of the non-open segment 8 cooperates with the non-open access controller 31 to request the access authority data and attribute data of the directory "SAMPLE", the access authority data and attribute data of the sub-directories of the directory "SAMPLE" and the attribute information of the file data stored in the directory "SAMPLE" to the access authority data managing DB device 40.

Step ST3:

In response to the request of the step ST2, the access authority data managing DB device 40 searches the access authority data and attribute data of the directory "SAMPLE", the access authority data and attribute data of the sub-directories of the directory "SAMPLE" and the attribute information of the file data stored in the directory "SAMPLE" and transmits them to the non-open WWW device 33.

Step ST4:

By using the access authority data and the attribute data received in step ST3, the non-open WWW device 33 creates the data of a renewed list display screen 50 on which the content thereof is displayed.

Step ST5:

The non-open WWW device 33 transmits the data of the list display screen 50 created and renewed in step ST4 to the terminal device 13 through the dedicated line 14.

Step ST6:

The terminal device 13 displays on the display portion the renewed list display screen 50 corresponding to the data received in step ST5.

In the operation example described above, the access authority data for the indicated directory is displayed. However, when the file data is indicated on the list display screen 50 shown in FIG. 2, the access authority data of the file data concerned is displayed.

SECOND OPERATION EXAMPLE

This operation example relates to a case where the user indicates the search button image 60 on the list display screen 50 shown in FIG. 2 by using the mouse or the like.

FIG. 7 is a diagram showing this operation example.

Step ST11:

The user indicates the search button image 60 on the list display screen 50 shown in FIG. 2 by using the mouse or the like.

Step ST12:

In response to the indication of the step ST11, the non-open WWW device 33 displays the search screen for indicating a search condition on the display portion of the terminal device 13.

Step ST13:

The user inputs the search condition on the search screen displayed in step ST12.

Step ST14:

The terminal device 13 indicates the search condition input in step ST13 and transmits a search instruction to the non-open www device 33.

Step ST15:

The non-open WWW device 33 inquires to the access authority data managing DB device 40 about the information of the directory/file data which is matched with the search condition indicated by the search instruction received in step ST14, for example, the access authority data, etc.

Step ST16:

On the basis of the inquiry of the step ST15, the access authority data managing DB device 40 searches the information matched with the search condition, and outputs the search result to the non-open WWW device 33.

Step ST17:

The non-open WWW device 33 creates the search result display screen on the basis of the search result input in step ST16, and displays it on the display portion of the terminal device 13.

THIRD OPERATION EXAMPLE

This operation example relates to a case where the name of a directory or file data is changed by using the list display screen 50 shown in FIG. 2.

FIG. 8 is a diagram showing this operation example.

Step ST21:

By using the mouse or the like, the user indicates on the list display screen 50 shown in FIG. 2 a sub-directory or file data whose name is changed.

Step ST22:

The user indicates the change button image 61 on the list display screen 50 of FIG. 2 by using the mouse or the like.

Step ST23:

In accordance with the indication of the step ST22, the non-open WWW device 33 displays the name changing screen on the display portion of the terminal device 13.

Step ST24:

The user inputs the name after change on the name changing screen displayed in step ST23.

Step ST25:

The terminal device 13 indicates the name after change input in step ST24, and transmits a name changing instruction to the non-open WWW device 33.

Step ST26:

The non-open WWW device 33 outputs a name changing instruction to the access authority data managing DB device 40 on the basis of the name after change which is indicated by the name changing instruction received in step ST25.

Step ST27:

In response to the name changing instruction of the step ST26, the access authority data managing DB device 40 changes the name of the indicated directory or file data.

Step ST28:

The access authority data managing DB device 40 outputs acompletion notification indicating the completion of the name change to the non-open WWW device 33.

Step ST29:

The non-open WWW device 33 transmits the completion notification indicating the name change completion to the terminal device 13.

FOURTH OPERATION EXAMPLE

This operation example relates to a case where a directory or file data is copied to another directory by using the list display screen 50 shown in FIG. 2.

FIG. 9 is a diagram showing this operation example.

Step ST31:

The user indicates a sub-directory or file data to be copied on the list display screen 50 shown in FIG. 2 by using the mouse or the like.

Step ST32:

The user indicates the copy button image 62 on the list display screen 50 of FIG. 2 by using the mouse or the like.

Step ST33:

In accordance with the indication of the step ST32, the non-open WWW device 33 displays a screen for indicating a copy destination on the display portion of the terminal device 13.

In this operation example, a directory in the non-open storage area of the storage device 41 is displayed as the copy destination.

Step ST34:

The user indicates the copy destination on the screen displayed in step ST33.

In this operation example, out of the directories in non-open storage area of the storage device 41, directories whose writing authority is given to the user can be indicated as the copy destination.

Step ST35:

The terminal device 13 indicates the copy source indicated in step ST31 and the copy destination indicated in step ST34 and transmits a copy instruction to the non-open WWW device 33.

Step ST36:

On the basis of the copy instruction received in step ST35, the non-open WWW device 33 outputs the access authority data changing instruction to the access authority data managing DB device 40.

Step ST37:

The access authority data managing DB device 40 renews the access authority data in response to the copy instruction input in step ST36.

Step ST38:

The access authority data managing DB device 40 outputs the completion notification indicating the change completion to the non-open WWW device 33.

Step ST39:

The non-open WWW device 33 renews the content of the storage device 41 on the basis of the copy instruction received in step ST35. That is, the data of the copy source are copied to the copy destination in the storage device 41.

Step ST40:

The non-open WWW device 33 transmits the completion notification indicating the copy completion to the terminal device 13.

FIFTH OPERATION EXAMPLE

In this operation example, a directory or file data is moved to another directory by using the list display screen 50 shown in FIG. 2.

Figure 10:
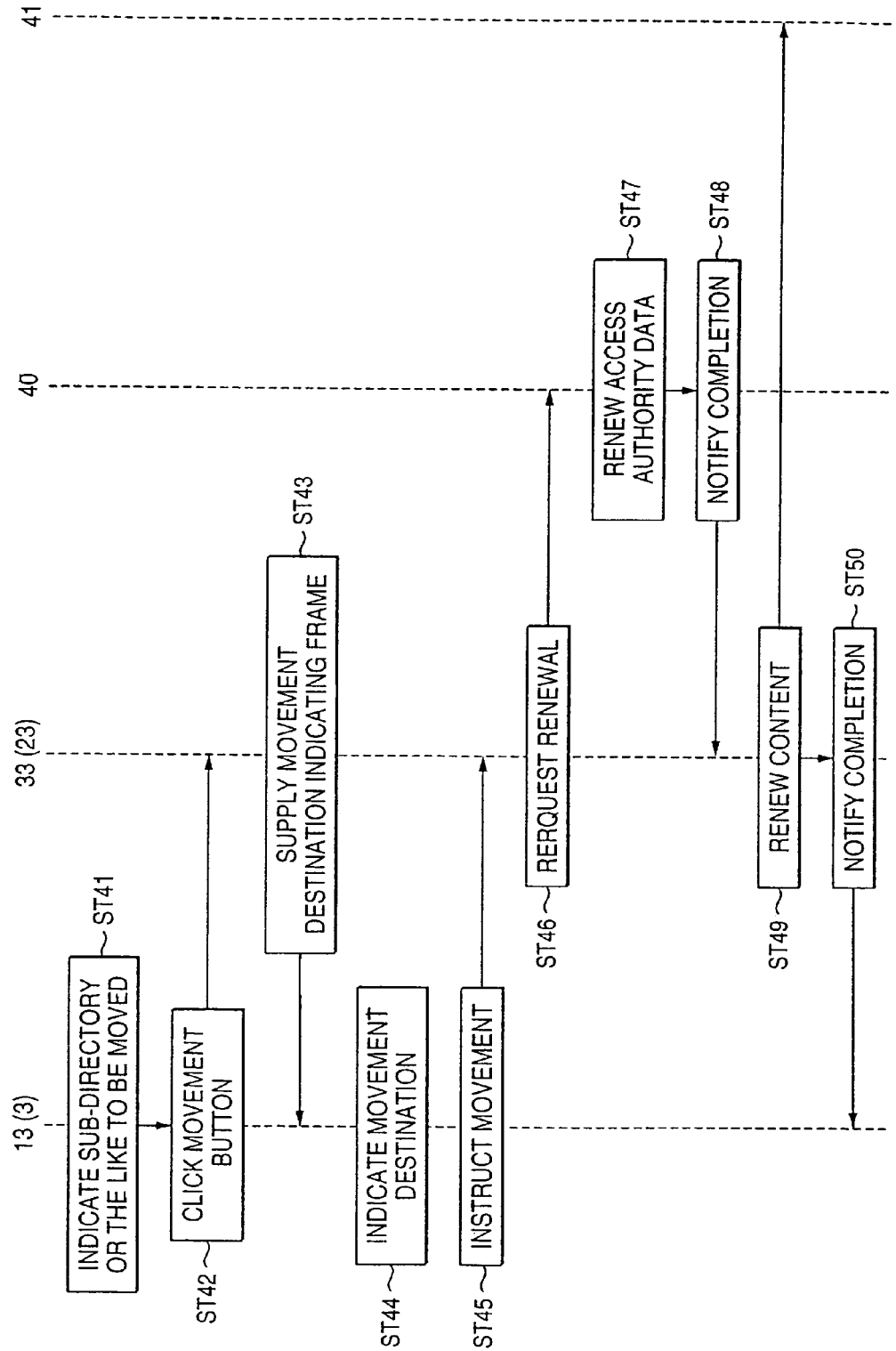

FIG. 10 is a diagram showing this operation example.

Step ST41:

The user indicates the sub-directory or file data to be moved on the list display screen 50 shown in FIG. 2 by using the mouse or the like.

Step ST42:

The user indicates the move button image 63 on the list display screen 50 shown in FIG. 2 by using the mouse or the like.

Step ST43:

In accordance with the indication of the step ST72, the non-open WWW device 33 displays the screen for indicating the movement destination on the display portion of the terminal device 13.

Step ST44:

The user indicates the movement destination on the screen displayed in step ST43.

Step ST45:

The terminal device 13 indicates the movement source indicated in step ST41 and the movement destination indicated in step ST44 and transmits a movement instruction to the non-open WWW device 33.

Step ST46:

The non-open WWW device 33 outputs the access authority data changing instruction to the access authority data managing DB device 40 on the basis of the movement instruction received in step ST45.

Step ST47:

The access authority data managing DB device 40 renews the access authority data in response to the movement instruction input in step ST 46.

Step ST48:

The access authority data managing DB device 40 outputs a completion notification indicating the change completion to the non-open WWW device 33.

Step ST49:

The non-open WWW device 33 renews the content of the storage device 41 on the basis of the movement instruction received in step ST45. That is, the data of the movement source is moved to the movement destination in the storage device 41.

Step ST50:

The non-open WWW device 33 transmits the completion notification indicating the movement completion to the terminal device 13.

SIXTH OPERATION EXAMPLE

This operation example relates to a case where a directory or file data is deleted by using the list display screen 50 shown in FIG. 2.

Figure 11:
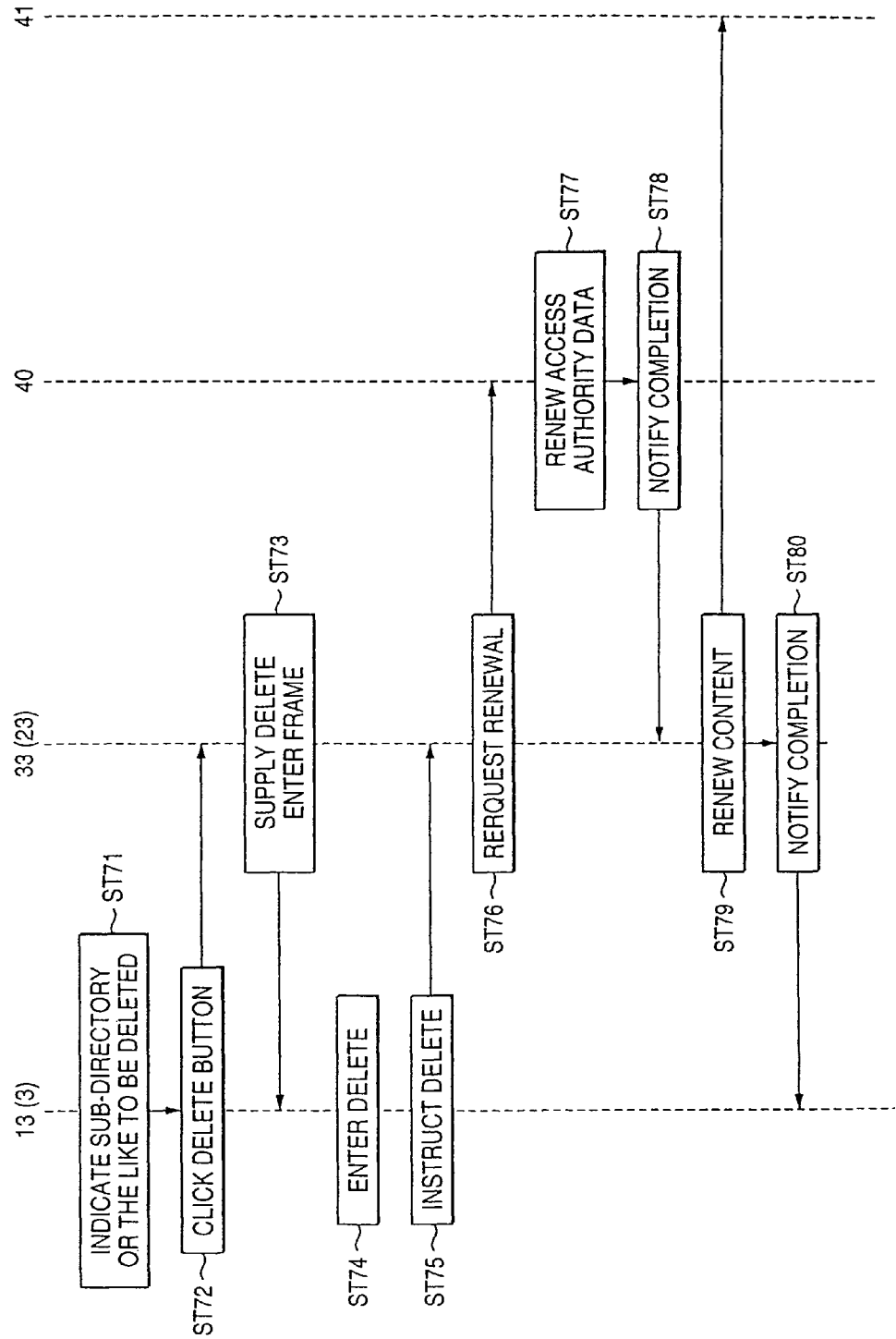

FIG. 11 is a diagram showing this operation example.

Step ST71:

The user indicates a sub-directory or file data to be deleted on the list display screen 50 shown in FIG. 2 by using the mouse or the like.

Step ST72:

The user indicates the delete button image 64 on the list display screen 50 shown in FIG. 2 by using the mouse or the like.

Step ST73:

In accordance with the indication of the step ST72, the non-open WWW device 33 displays a screen for confirming delete (delete entering screen) on the display portion of the terminal device 13.

Step ST74:

After checking on the delete entering screen displayed in step ST73, the user enters delete.

Step ST75:

The terminal device 13 indicates the directory or file data indicated in step ST71 and transmits a deleting instruction to the non-open WWW device 33.

Step ST76:

On the basis of the deleting instruction received in step ST75, the non-open WWW device 33 outputs an access authority data changing instruction to the access authority data managing DB device 40.

Step ST77:

The access authority data managing DB device 40 renews the access authority data in response to the deleting instruction input in step ST76.

Step ST78:

The access authority data managing DB device 40 outputs a completion notification indicating the change completion to the non-open WWW device 33.

Step ST79:

On the basis of the deleting instruction received in step ST75, the non-open WWW device 33 renews the content of the storage device 41. That is, the indicated directory or file data is deleted in the storage device 41.

Step ST80:

The non-open WWW device 33 transmits a completion notification indicating the deletion completion to the terminal device 13.

SEVENTH OPERATION EXAMPLE

This operation example relates to a case where a directory or file data in the non-open storage area of the storage device 41 is coped into the open storage area of the storage device 41 by using the list display screen 50 shown in FIG. 2.

Figure 12:
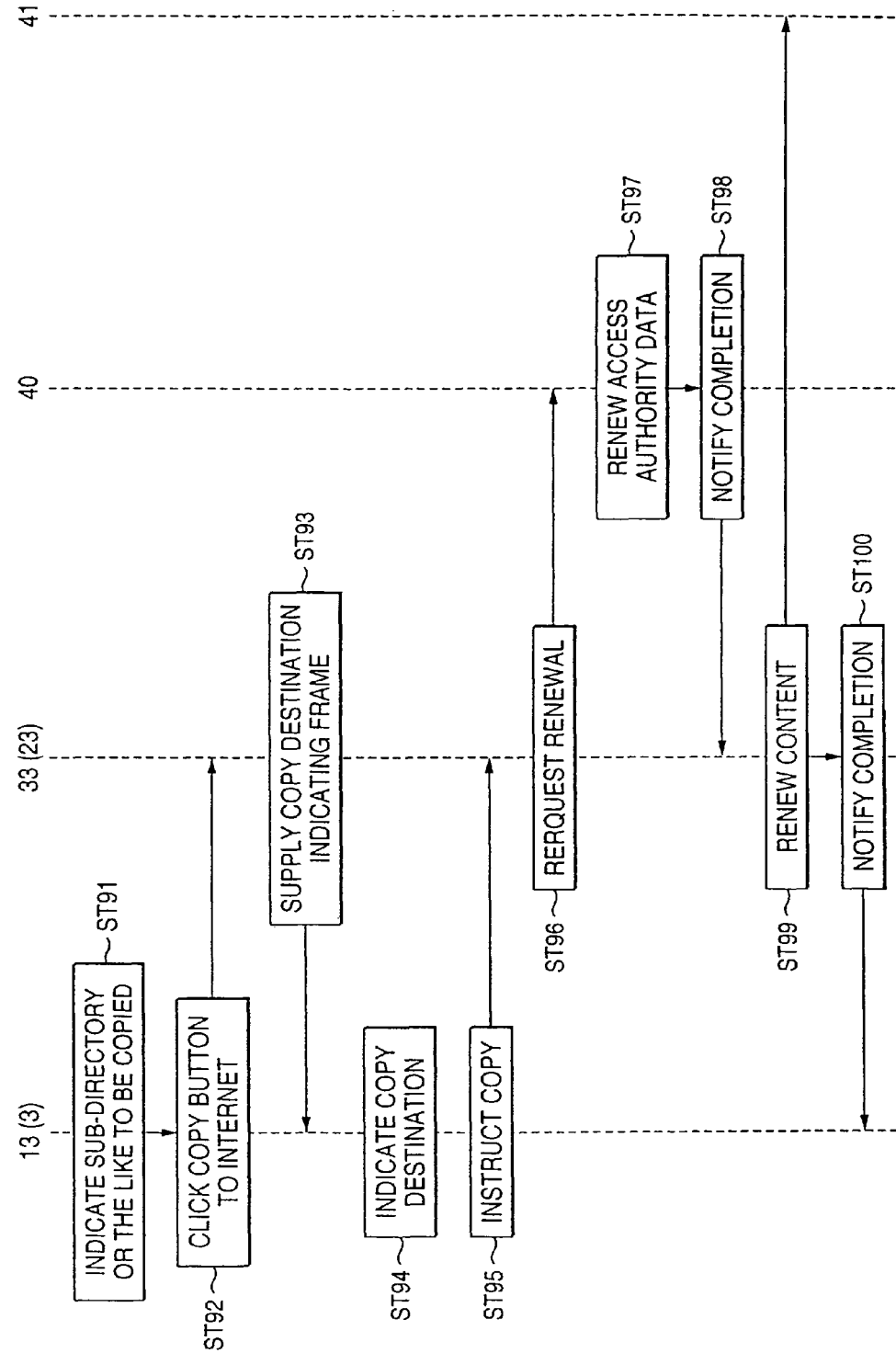

FIG. 12 is a diagram showing this operation example.

Step ST91:

The user indicates a sub-directory or file data to be copied on the list display screen 50 shown in FIG. 2 by using the mouse or the like.

Step ST92:

The user indicates the copy button image 65 to the Internet on the list display screen 50 shown in FIG. 2 by using the mouse or the like.

Step ST93:

In accordance with the indication of the step ST92, the non-open WWW device 33 displays a screen for indicating a copy destination on the display portion of the terminal device 13.

In this operation example, a directory in the open storage area of the storage device 41 is displayed as a copy destination.

Step ST94:

The user indicates the copy destination on the screen displayed in step ST93.

In this operation example, a directory whose writing authority is given to the user in the directories in the open storage area of the storage device 41 can be indicated as the copy-destination, for example.

Step ST95:

The terminal device 13 indicates the copy source indicated in the step ST91 and the copy destination indicated in the step ST94, and transmits a copy instruction to the non-open WWW device 33.

Step ST96:

On the basis of the copy instruction received in step ST95, the non-open WWW device 33 judges the authentication of the copy concerned on the basis of user ID and access authority data, and then outputs an access authority data changing instruction to the access authority data managing DB device 40.

Step ST97:

The access authority data managing DB device 40 renews the access authority data in response to the copy instruction input in step ST96.

Step ST98:

The access authority data managing DB device 40 outputs a completion notification indicating the change completion to the non-open WWW device 33.

Step ST99:

The non-open WWW device 33 renews the content of the storage device 41 on the basis of the copy instruction received in step ST95. That is, the data of the copy source are copied to the copy destination in the storage device 41.

Step ST100:

The non-open WWW device 33 transmits a completion notification indicating the copy completion to the terminal device 13.

EIGHTH OPERATION EXAMPLE

This operation example relates to a case where a directory is newly created by using the list display screen 50 shown in FIG. 2.

Figure 13:
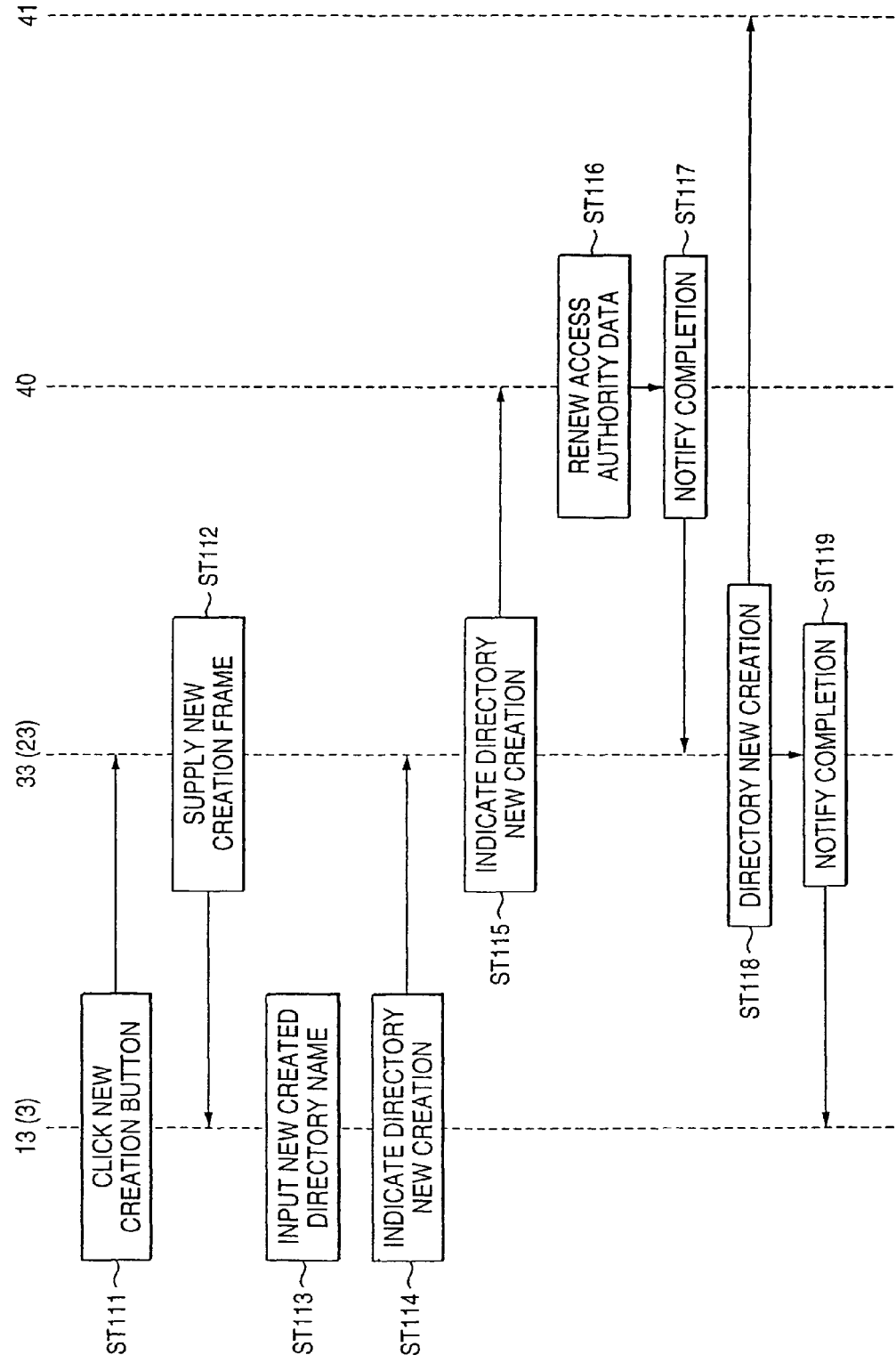

FIG. 13 is a diagram showing this operation example.

Step ST111:

The user indicates a new creation button image 66 on the list display screen 50 shown in FIG. 2 by using the mouse or the like.

Step ST112:

In accordance with the indication of the step ST111, the non-open WWW device 33 displays a screen for inputting the directory name on the display portion of the terminal device 13.

Step ST113:

The user inputs the directory name on the screen displayed in step ST112.

Step ST114:

The terminal device 13 indicates the directory name input in step ST113, and transmits a directory new creation instruction to the non-open WWW device 33.

Step ST115:

When acknowledging the authentication of the new creation of the directory concerned on the basis of the user ID and access authority data, the non-open WWW device 33 judges the authentication of the new creation of the directory concerned on the basis of the user ID and the access authority data in response to the directory new creation instruction received in step ST114, and then outputs a directory new creation instruction to the access authority data managing DB device 40.

Step ST116:

The access authority data managing DB device 40 renews the access authority data in response to the directory new creation instruction input in step ST115.

Step ST117:

The access authority data managing DB device 40 outputs a completion notification indicating the completion of the directory new creation to the non-open WWW device 33.

Step ST118:

The non-open WWW device 33 creates a new direction having the directory name thus indicated into the non-open storage area of the storage device 41 on the basis of the directory new creation instruction received in step ST114.

Step ST119:

The non-open WWW device 33 transmits the completion notification indicating the completion of the directory new creation to the terminal device 13.

NINTH OPERATION EXAMPLE

This operation example relates to a case where new file data are uploaded into an indicated directory by using the list display screen 50 shown in FIG. 2.

Figure 14:
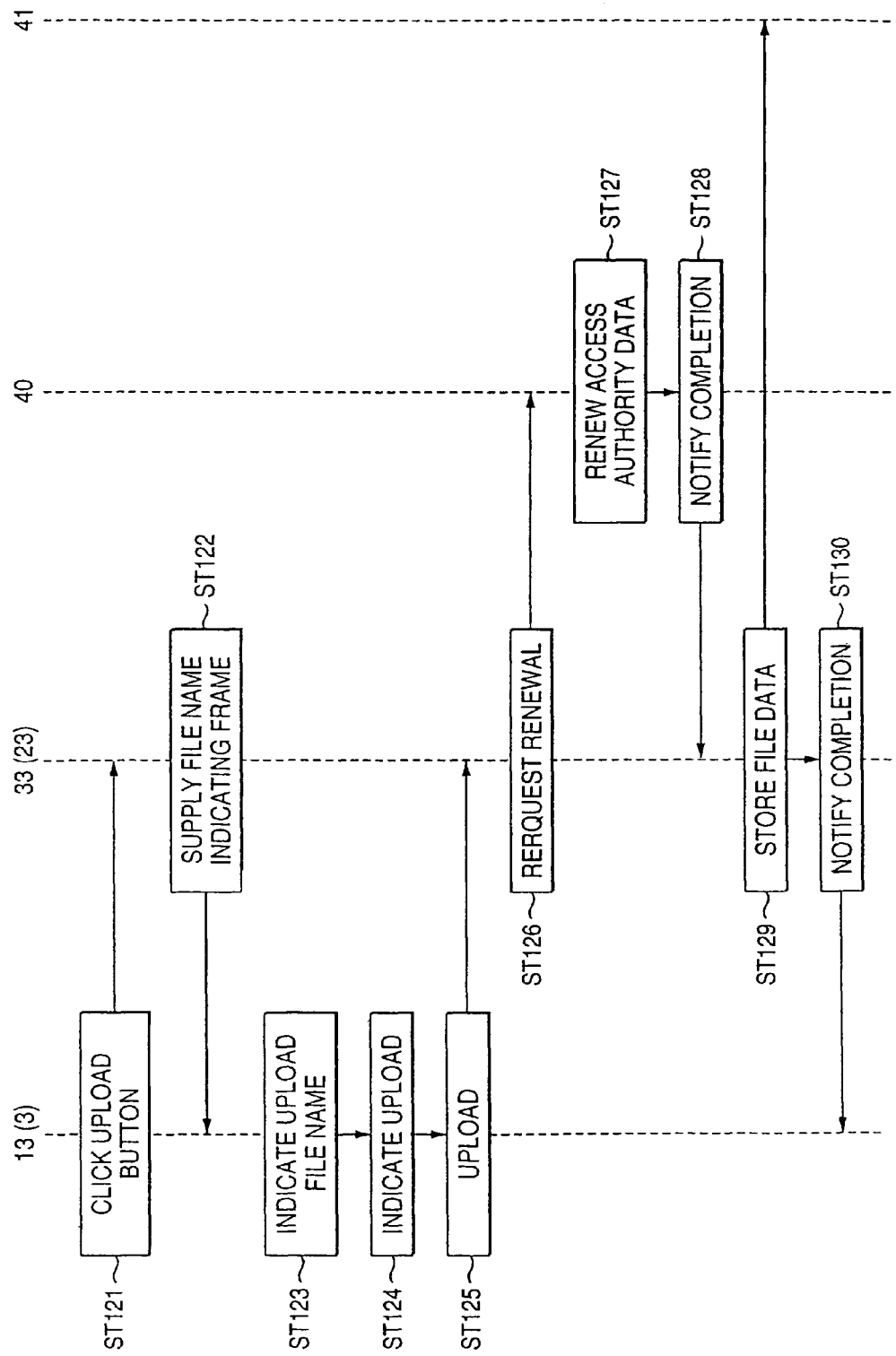

FIG. 14 is a diagram showing this operation example.

Step ST121:

The user indicates the upload button image 67 on the list display screen 50 shown in FIG. 2 by using the mouse or the like.

Step ST122:

In accordance with the indication of the step ST121, the non-open WWW device 33 displays a screen for inputting the name of upload file on the display portion of the terminal device 13.

Step ST123:

The user inputs the file name of the file data to be uploaded on the screen displayed in step ST122.

Step ST124:

The terminal device 13 indicates the file name input in step ST123 and transmits an upload instruction to the non-open WWW device 33.

Step ST125:

When acknowledging the authentication of the upload instruction on the basis of user ID and access authority data, the non-open WWW-device 33 receives the update of the file data having the file name indicated instep ST124 from the terminal device 13.

Step ST126:

The non-open WWW device 33 outputs a request for renewing the access authority data to the access authority data managing DB device 40.

Step ST127:

The access authority data managing DB device 40 renews the access authority data concerning the uploaded file data.

Step ST128:

The access authority data managing DB device 40 outputs a completion notification indicating the completion of the directory new creation to the non-open WWW device 33.

Step ST129:

The non-open WWW device 33 stores the file data uploaded in step ST124 into the non-open storage area of the storage device 41.

Step ST130:

The non-open WWW device 33 transmits a completion notification indicating the completion of the upload to the terminal device 13.

TENTH OPERATION EXAMPLE

This operation example relates to a case where the user indicates an access authority image on the list display screen 50 shown in FIG. 2 by clicking the mouse or the like.

Figure 15:
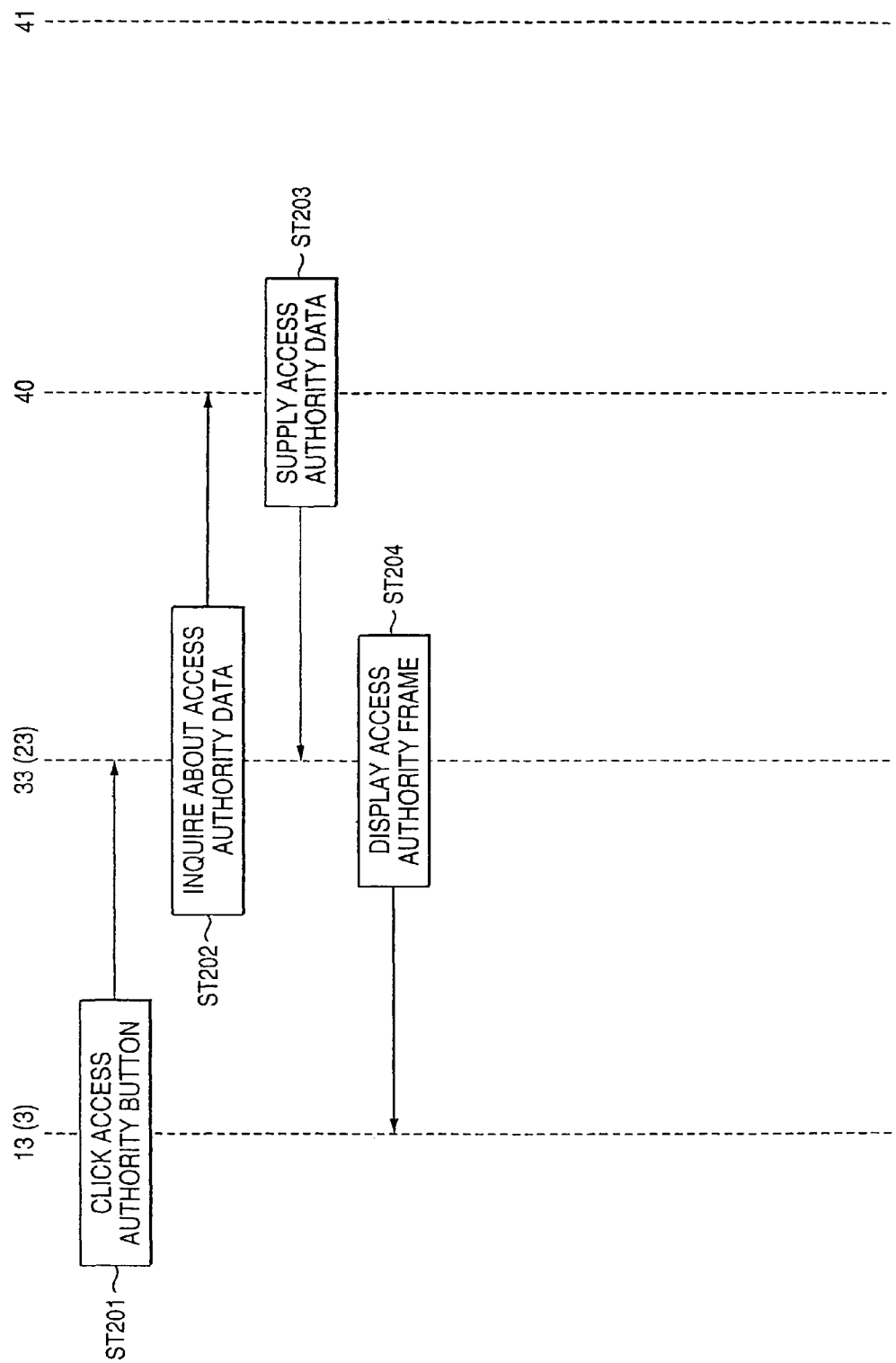

FIG. 15 is a diagram showing this operation example.

Step ST201:

The user 12 indicates the display image of the access authority on the list display screen 50 shown in FIG. 2 by clicking the mouse or the like.

Step ST202:

In response to the instruction of the step ST201, the non-open WWW device 33 of the non-open segment 8 cooperates with the non-open access controller 31 to request the access authority data of the directory concerned to the access authority data managing DB device 40.

Step ST203:

In response to the request of the step ST202, the access authority data managing DB device 40 searches the access authority data of the directory concerned and transmits it to the non-open WWW device 33.

Step ST204:

The non-open WWW device 33 makes the terminal device 13 display the access authority screen 150 shown in FIG. 3 thereon by using the access authority data received in step ST203.

ELEVENTH OPERATION EXAMPLE

This operation example relates to a case where group or user who can be given access authority for an indicated directory is added by using the access authority screen 150 shown in FIG. 3.

Figure 16:
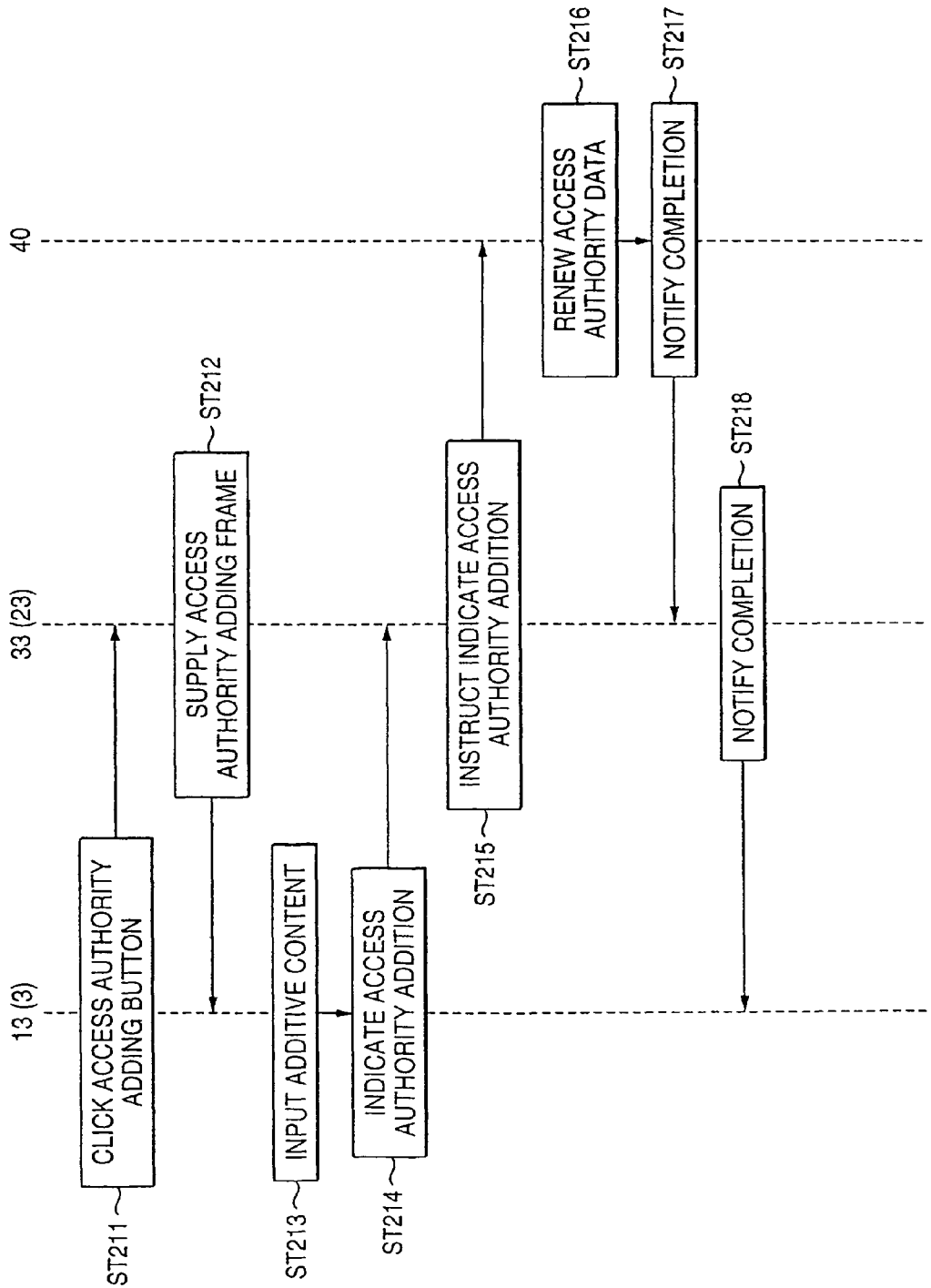

FIG. 16 is a diagram showing this operation example.

Step ST211:

The user indicates an access group adding button image 169 or access user adding button image 170 on the access authority screen 150 shown in FIG. 3 by using the mouse or the like.

Step ST212:

In accordance with the indication of the step ST211, the non-open WWW device 33 displays a screen for inputting an additive content of the access authority on the display portion of the terminal device 13.

Step ST213:

The user inputs the additive content of the access authority on the screen displayed in step ST212.

Step ST214:

The terminal device 13 indicates the access authority additive content input in the step ST213, and transmits an access authority adding instruction to the non-open WWW device 33.

Step ST215:

When acknowledging the authentication of the access authority adding instruction on the basis of user ID and access authority data, the non-open WWW device 33 outputs the access authority adding instruction to the access authority data managing DB device 40 on the basis of the access authority additive content received in step ST214.

Step ST216:

The access authority data managing DB device 40 renews the access authority data in response to the access authority adding instruction input in step ST215.

Step ST217:

The access authority data managing DB device 40 outputs a completion notification indicating the completion of the access authority addition to the non-open WWW device 33.

Step ST218:

The non-open WWW device 33 transmits the completion notification indicating the completion of the access authority addition to the terminal device 13.

TWELFTH OPERATION EXAMPLE

This operation example relates to a case where the access authority of a group or user set in the indicated directory is changed by using the access authority screen 150 shown in FIG. 3.

Figure 17:
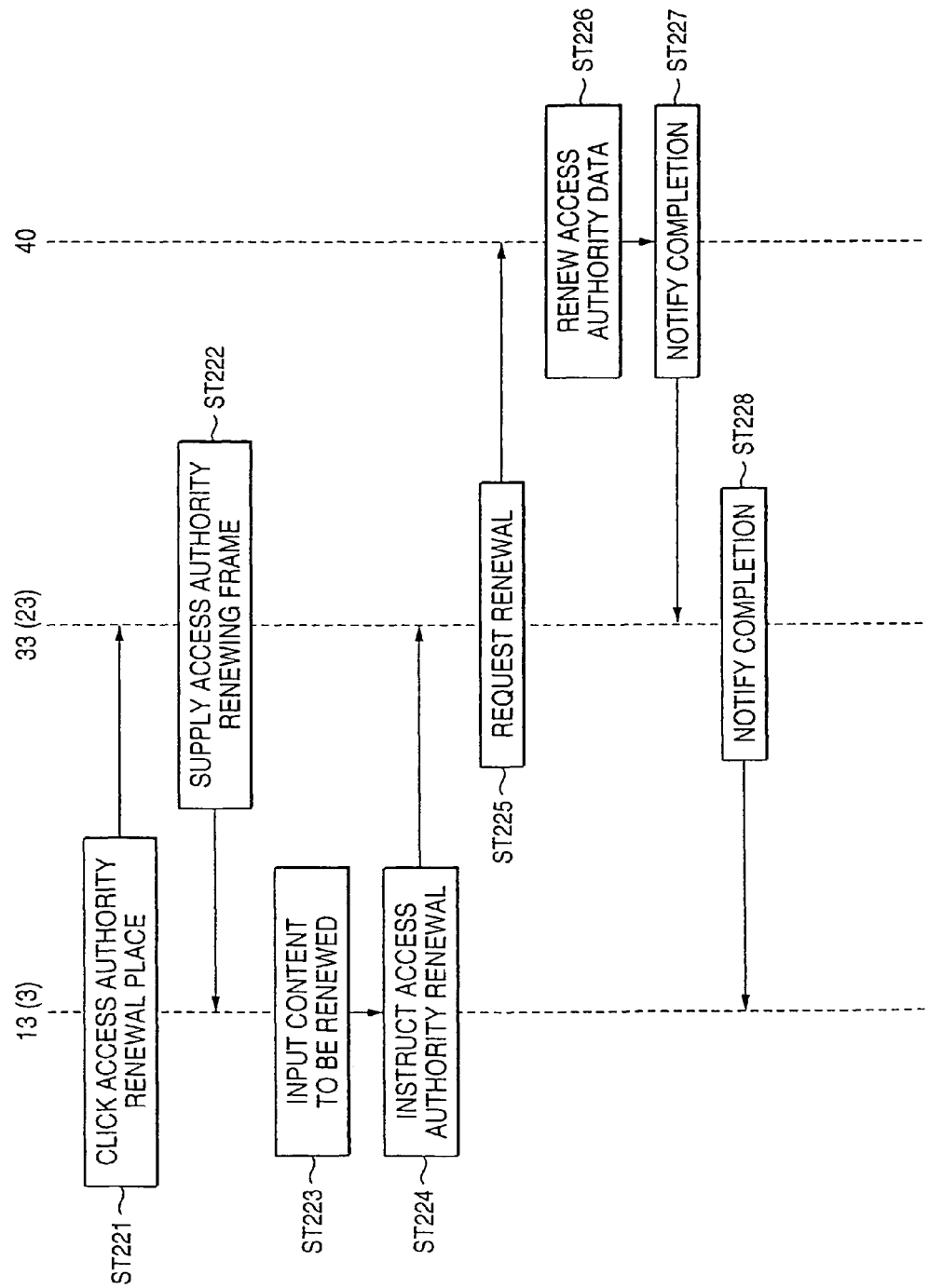
FIG. 17 is a diagram showing an example of the operation when a user clicks an access authority place to be changed on the access authority screen shown in FIG. 3 by using a mouse.

FIG. 17 is a diagram showing this operation example.

Step ST221:

The user indicates a name display place of an access-authority changing group or user on the access authority screen 150 shown in FIG. 3 by clicking the mouse or the like.

Step ST222:

In accordance with the indication of the step ST221, a screen for changing the access authority of the indicated group or user is displayed on the display portion of the terminal device 13.

Step ST223:

The content after the access authority is changed is input on the screen displayed in step ST222 by the user.

Step ST224:

The terminal device 13 indicates the content after the change of the access authority input in step ST223, and transmits an access authority changing instruction to the non-open WWW device 33.

Step ST225:

When acknowledging the authentication of the access authority changing instruction on the basis of user ID and access authority data, the non-open WWW device 33 outputs an access authority changing instruction to the access authority data managing DB device 40 on the basis of the access authority changing content received in step ST224.

Step ST226:

In response to the access changing instruction input in step ST225, the access authority data managing DB device 40 renews the access authority data.

Step ST227:

The access authority data managing DB device 40 outputs a completion notification indicating the completion of the access authority change to the non-open WWW device 33.

Step ST228:

The non-open WWW device 33 transmits the completion notification indicating the access authority change completion to the terminal device 13.

THIRTEENTH OPERATION EXAMPLE

This operation example relates to a case where the user deletes access authority on the access authority screen 150.

FIG. 18 is a diagram showing this operation example.

Step ST231:

The user indicates a name display place of an access-authority deleting group or user on the access authority screen 150 shown in FIG. 3 by clicking the mouse or the like.

Step ST232:

The user indicates the delete button image 164 on the access authority screen 150 by clicking the mouse or the like.

Step ST233:

In accordance with the indication of the step ST232, the non-open WWW device 33 displays a screen for entering deletion of the access authority of the indicated group or user on the terminal device 13.

Step ST234:

The user instructs the entering of the deletion on the screen displayed in step ST233 by using the mouse or the like.

Step ST235:

When acknowledging the authentication of the access authority deletion on the basis of user ID and access authority data, the non-open WWW device 33 indicates the group or user indicated in step ST231 and outputs an access authority deleting instruction to the access authority data managing DB device 40.

Step ST236:

The access authority data managing DB device 40 renews the access authority data in response to the access authority deletion instruction input in step ST235.

Step ST237:

The access authority data managing DB device 40 outputs a completion notification indicating the completion of the access authority deletion to the non-open WWW device 33.

Step ST238:

The non-open WWW device 33 transmits a completion notification indicating the access authority deletion completion to the terminal device 13.

FOURTEENTH OPERATION EXAMPLE

This operation example relates to a case where the user instructs comment display on the list display screen 50 shown in FIG. 2.

FIG. 19 is a diagram showing this operation example.

Step ST241:

The user indicates a place of comment data in the file attribute display image 54 on the list display screen 50 shown in FIG. 2 by clicking the mouse or the like.

Step ST242:

In accordance with the indication of the step ST241, the non-open WWW device 33 inquires about the file name of the file data containing the indicated comment data to the access authority data managing DB device 40.

Step ST243:

In response to the inquiry of the step ST242, the access authority data managing DB device 40 searches the file name of the file data stored the indicated comment data, and outputs the search result to the non-open WWW device 33.

Step ST244:

The non-open WWW device 33 achieves the comment data contained in the indicated file data from the storage device 41 with the file name input in the step ST243 as a key.

Step ST245:

The non-open WWW device 33 displays on the terminal device 13 the comment screen 200 for displaying the comment data achieved in step ST244 as shown in FIG. 5.

FIFTEENTH OPERATION EXAMPLE

This operation example relates to a case where the user adds a comment on the comment screen 200 shown in FIG. 5.

FIG. 19 is a diagram showing this operation example.

Step ST251:

For example, the user operates a keyboard or the like to input the content of a comment to be added into a column of a comment image 202 on the comment screen 200 shown in FIG. 5.

Step ST252:

The user operates and clicks the mouse or the like to indicate a comment adding button image 203 on the comment screen 200.

Step ST253:

In accordance with the operation of the step ST252, the non-open WWW device 33 inquires about the name of file data containing the comment data concerned to the access authority data managing DB device 40.

Step ST254:

In accordance with the inquiry of the step ST253, the access authority data managing DB device 40 searches the name of the file data concerned and outputs the search result to the non-open WWW device 33.

Step ST255:

The non-open WWW device 33 accesses the storage device 41 by using the name of the file data achieved in step ST254, and adds the content of the additive comment input in step ST251 into the file data concerned.

Step ST256:

The non-open WWW device 33 transmits a completion notification indicating the completion of the comment addition to the terminal device 13.

In the operation examples described above, the terminal device 13 accesses the non-open segment 8 through the router 6. The operation example in which the terminal device 13 accesses the open segment 7 through the router 6 corresponds to the case where the operations of the non-open access controller 31, the switch device 32 and the non-open WWW device 33 in the above operation examples are replaced by the operations of the open access controller 21, the switch device 22 and the open WWW device 23.

The operation example in which the terminal device 3 accesses the non-open segment 8 through the router 6 corresponds to the case where the operations of the non-open access controller 31, the switch device 32 and the non-open WWW device 33 in the above operation examples are replaced by the operations of the open access controller 21, the switch device 22 and the open WWW device 23.

As described above, according to the communication system 1, plural users can commonly use the storage device 41 from the terminal device 3 and the terminal 13 on the Internet 4 and the dedicated line 14 with keeping predetermined security.

Furthermore, according to the communication system 1, minute access control can be performed every user or every group.

Still furthermore, according to the communication system 1, users registered as managers can execute registration of general users by themselves.

Still furthermore, according to the communication system 1, storage services can be supplied in accordance with users' features by actively using the advantages of the Internet 4 and the dedicated line 14.

Still furthermore, according to the communication system 1, the terminal device 3 and the terminal device 13 can be provided with the above storage services by using general browsers.

Still furthermore, according to the communication system 1, users can use file data stored in the storage device 41 while adding the file data with comment data.

The present invention is not limited to the above-described embodiments.

For example, in the above-described embodiments, the users access the open segment 7 and the non-open segment 8 through both the Internet 4 and the dedicated line 14. However, the present invention may be applied to a case where the users access the open segment 7 through the Internet 4 and a case where the users access the non-open segment 8 through the dedicated line 14.

As described above, according to the present invention, there can be provided a communication device, a communication system and a method therefor with which plural users can commonly use the storage on a network with keeping securities.

What is claimed is:

1. A communication system which accepts an access from a single or plural other communication devices through a network in accordance with the operation of plural users, comprising:

storage means;

an open segment comprising a first controller for access via a public network;

a non-open segment comprising a second controller for access via a dedicated line, the second controller being separate from, and not directly connected to, the first controller;

a common router for managing access to the open segment and access to the non-open segment, the common router coupled to at least one of the single or plural other communication devices by a dedicated line and the common router coupled to at least another one of the single or plural other communication devices by a public network, and the common router routing the access received from the public network to the open segment, and routing the access received through the dedicated line to one of the open segment and the non-open segment;

managing means for managing access authority data that defines access authority for at least one of first and second areas logically or physically defined in a storage area of said storage means and file data stored in the first and second storage areas related to at least one of a user who makes the access or a group to which the user belongs;

a first computing device, which is located in the open segment, for inquiring to said managing means in accordance with the access to the first storage area and controlling the access to the first storage area on the basis of the access authority data received from said managing means in response to the inquiry concerning every user or group; and a second computing device, which is located in the non-open segment, for inquiring to said managing means in accordance with the access to the second storage area and controlling the access to the second storage area on the basis of the access authority data received from said managing means in response to the inquiry concerning every user or group.

2. The communication system as claimed in claim 1, wherein, the first controller is adapted to perform user authentication to judge whether a user has access authority for the open segment, and is adapted to permit an access from the single or plural other communication devices to the open segment under the condition that the authentication of the user concerned is accepted; and the second controller is adapted to perform user authentication to judge whether a user has access authority for the non-open segment, and is adapted to permit an access from the single or plural other communication device to the non-open segment under the condition that the authentication of the user concerned is accepted.

3. The communication system as claimed in claim 2, wherein said first controller is adapted to permit a prescribed user making an access through a public network and a prescribed user making the access through a specific dedicated line to make the access to the open segment, and second controller is adapted to permit a prescribed user making the access through a specific dedicated line to make an access to the non-open segment.

4. A communication method for receiving an access from single or plural other communication devices through a network in accordance with operations of plural users, comprising:

a step of managing access authority data which defines access authority for at least one of first and second storage areas defined logically or physically in a storage means and file data stored in the first and second storage areas related to at least one of a user who makes the access and a group to which the user belongs, a first control step of controlling access from a public network to an open segment via a first controller;

a second control step of controlling access from a dedicated line to a non-open segment via a second controller, the second controller being separate from, and not directly connected to, the first controller;

a step of receiving access request from either the public network or the dedicated line through a common router common to the public network and the dedicated line, the common router coupled to at least one of the single or plural other communication devices by a dedicated line and coupled to at least another one of the single or plural other communication devices by a public network, and the common router routing access received from the public network to the open segment and routing access received through the dedicated line to one of the open segment and the non-open segment;

a first computing step, in the open segment, of inquiring to the step of managing access authority data in accordance with access to the first storage area and controls the access to the first storage area on the basis of access authority data received from the step of managing access authority data in response to inquiry concerning every user or group, and a second computing step, in the non-open segment, of inquiring to the managing means in accordance with access to the second storage area, and controlling the access to the second storage area on the basis of access authority data received from the step of managing access authority data in response to inquiry concerning every user or group.

5. The communication method as claimed in claim 4, wherein:

the first control step performs user authentication to judge whether a user has access authority for the open segment, and permitting an access from the single or plural other communication devices to the open segment under the condition that the authentication of the user concerned is accepted, and the second control step performs user authentication to judge whether a user has access authority for the non-open segment, and permitting an access from the single or plural other communication devices to the non-open segment under the condition that the authentication of the user concerned is accepted.

6. The communication method as claimed in claim 5, wherein the first control step permits a prescribed user making an access through a public network and a prescribed user making the access through a specific dedicated line to make the access to the open segment, and the second control step permits a prescribed user making the access through a specific dedicated line to make an access to the non-open segment.

\* \* \* \* \*